US011210650B2

(12) United States Patent
Chen et al.

(10) Patent No.: US 11,210,650 B2
(45) Date of Patent: Dec. 28, 2021

(54) CREDIT PAYMENT METHOD AND APPARATUS BASED ON MOBILE TERMINAL EMBEDDED SECURE ELEMENT

(71) Applicant: Advanced New Technologies Co., Ltd., George Town (KY)

(72) Inventors: Xing Chen, Hangzhou (CN); Lei Wang, Hangzhou (CN); Kai Tang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/720,400

(22) Filed: Dec. 19, 2019

(65) Prior Publication Data

US 2020/0143356 A1 May 7, 2020

Related U.S. Application Data

(63) Continuation of application No. 16/042,772, filed on Jul. 23, 2018, which is a continuation of application No. PCT/CN2017/071246, filed on Jan. 16, 2017.

(30) Foreign Application Priority Data

Jan. 25, 2016 (CN) .......................... 201610049851.4

(51) Int. Cl.
*G06Q 20/32* (2012.01)
*G06Q 20/24* (2012.01)
(Continued)

(52) U.S. Cl.
CPC ......... *G06Q 20/3227* (2013.01); *G06Q 20/24* (2013.01); *G06Q 20/32* (2013.01);
(Continued)

(58) Field of Classification Search
None
See application file for complete search history.

(56) References Cited

U.S. PATENT DOCUMENTS 10,136,315 B2  11/2018  Gong et al.
2001/0044911 A1  11/2001  Iijima
(Continued)

FOREIGN PATENT DOCUMENTS

CN  101739771  6/2010
CN  101814169  8/2010
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Jamie R Kucab
*Assistant Examiner* — Nicholas K Phan
(74) *Attorney, Agent, or Firm* — Fish & Richardson P.C.

(57) ABSTRACT

Technologies related to credit payment based on a mobile terminal embedded secure element are disclosed. In an implementation, a payment request is received from a mobile computing device associated with a user account. The payment information including a payment amount is generated based on the payment request. The payment information is then sent to the mobile computing device. A payment authorization encrypted by a private key is received based on asymmetric encryption from the mobile computing device. A public key corresponding to the private key is used to verify the payment authorization, and a transaction log is generated for collecting a payment according to the payment amount if the payment authorization is successfully verified.

18 Claims, 37 Drawing Sheets

(51) Int. Cl.
  *G06Q 20/40* (2012.01)
  *G06Q 20/38* (2012.01)

(52) U.S. Cl.
  CPC ......... *G06Q 20/3829* (2013.01); *G06Q 20/40* (2013.01); *G06Q 20/401* (2013.01)

(56) References Cited

U.S. PATENT DOCUMENTS

| | | | |
|---|---|---|---|
| 2004/0083182 A1 | 4/2004 | Moribatake et al. | |
| 2004/0268127 A1* | 12/2004 | Sahota | H04L 9/0625 713/175 |
| 2005/0125294 A1 | 6/2005 | Dupre et al. | |
| 2006/0047960 A1* | 3/2006 | Ono | H04L 9/0891 713/171 |
| 2007/0162389 A1 | 7/2007 | Hamilton et al. | |
| 2009/0068982 A1 | 3/2009 | Chen et al. | |
| 2009/0119221 A1* | 5/2009 | Weston | G07F 7/1008 705/76 |
| 2009/0132813 A1 | 5/2009 | Schibuk | |
| 2009/0144161 A1* | 6/2009 | Fisher | G06Q 40/12 705/16 |
| 2010/0057579 A1* | 3/2010 | Tan | G06Q 20/105 705/17 |
| 2011/0099079 A1 | 4/2011 | White | |
| 2011/0295750 A1* | 12/2011 | Rammal | G06Q 20/322 705/44 |
| 2013/0001304 A1 | 1/2013 | Xu et al. | |
| 2013/0139230 A1 | 5/2013 | Koh et al. | |
| 2014/0372743 A1* | 12/2014 | Rogers | G06F 21/575 713/2 |
| 2015/0052064 A1* | 2/2015 | Karpenko | G06Q 20/3829 705/71 |
| 2015/0149365 A1* | 5/2015 | Mobini | G06Q 20/02 705/75 |
| 2015/0213433 A1 | 7/2015 | Khan | |
| 2015/0254637 A1* | 9/2015 | Yang | G06Q 20/3278 705/39 |
| 2015/0262170 A1 | 9/2015 | Bouda | |
| 2015/0278796 A1 | 10/2015 | Jiang et al. | |
| 2015/0310431 A1 | 10/2015 | Lakshmanan et al. | |
| 2015/0350214 A1 | 12/2015 | Gilpin et al. | |
| 2016/0019536 A1 | 1/2016 | Ortiz et al. | |
| 2016/0140548 A1* | 5/2016 | Ahn | G06Q 20/3829 705/71 |
| 2016/0267458 A1* | 9/2016 | Metral | G06Q 20/3278 |
| 2018/0330359 A1 | 11/2018 | Chen et al. | |

FOREIGN PATENT DOCUMENTS

| | | |
|---|---|---|
| CN | 102081821 | 6/2011 |
| CN | 102317963 | 1/2012 |
| CN | 102467789 | 5/2012 |
| CN | 103186858 | 7/2013 |
| CN | 103530775 | 1/2014 |
| CN | 103942684 | 7/2014 |
| CN | 104580256 | 4/2015 |
| CN | 104899731 | 9/2015 |
| CN | 104915832 | 9/2015 |
| JP | H11265417 | 9/1999 |
| JP | 2002142260 | 5/2002 |
| JP | 2007128246 | 5/2007 |
| JP | 2012113555 | 6/2012 |
| JP | 2013546108 | 12/2013 |
| KR | 20010025193 | 4/2001 |
| KR | 20110062937 | 6/2011 |
| WO | WO 03105037 | 12/2003 |
| WO | WO 2015148850 | 10/2015 |

OTHER PUBLICATIONS

Extended European Search Report in European Application No. 17743589.8, dated Aug. 26, 2019, 8 pages.
International Search Report issued by the International Searching Authority in International Application No. PCT/CN2017/071246 dated Apr. 21, 2017; 8 pages.
Nakamoto, "Bitcoin: A Peer-to-Peer Electronic Cash System," www.bitcoin.org, 2005, 9 pages.
PCT International Preliminary Report on Patentability in International Application No. PCT/CN2017/071246, dated Jul. 31, 2018, 10 pages (with English translation).
Ozaki et al. "A Mutual Authentication System with Public Key Cryptosystem on a Cellular Phone," Computer Security Symposium 2005, Oct. 26, 2005, 2005(13):1535-540 (with English abstract).
bok.or.kr [online], "Standards for Financial IC Cards Specification part2—Open Platform," Apr. 6, 2014, retrieved on Jul. 19, 2021, retrieved from URL<https://www.bok.or.kr/portal/bbs/B0000239/view.do?httId=201527&menuNo=200729>, 158 pages (with English abstract).
Dizaj, "New mobile payment protocol: Mobile pay center protocol 4 (MPCP4) by using new key agreement protocol VAC2," 3rd International Conference on Electronics Computer Technology, Jul. 7, 2011, pp. 67-73.
Ru et al., "Terminator Security Mobile Payment Protocol using Certificateless Public Keys Cryptography," Application Research of Computers, Mar. 2015, 32(3):912-916 (with English abstract).
Wang et al., "Lightweight CA-based Mobile Online Payment Protocol," Computer Applications and Software, Dec. 2015, 32(12):286-289 (with English Abstract).

\* cited by examiner

CREDIT PAYMENT METHOD AND APPARATUS BASED ON MOBILE TERMINAL EMBEDDED SECURE ELEMENT

This application is a continuation of U.S. patent application Ser. No. 16/042,772, filed on Jul. 23, 2018, which is a continuation of PCT Application No. PCT/CN2017/071246, filed on Jan. 16, 2017, which claims priority to Chinese Patent Application No. 201610049851.4, filed on Jan. 25, 2016, and each application is hereby incorporated by reference in its entirety.

TECHNICAL FIELD

The present disclosure relates to the field of communications technologies, and in particular, to a credit payment method and apparatus based on a mobile terminal embedded secure element (eSE).

BACKGROUND

Currently, public transportation mainly includes ground transportation and subways. When users purchase public transportation tickets, they normally use cash or pre-paid cards. Cash payment is mainly used for the public transportation system, and the user can buy a ticket by inserting coins. Users can alternatively get pre-paid metro cards, and take a bus or subway by scanning the card.

When a user purchases a bus ticket in cash, because many buses are self-serving and provide no exchange, the user needs to prepare the exact amount of fares in advance, which can be inconvenient to the user. Moreover, after close of business, bus system staff needs to count all the small fares that are put in by the self-service bus users, bringing extra work to the staff. When a user uses a metro card to take the public transportation, because most current metro cards are non-contact radio frequency (RF) cards, user-caused damages and wears, such as bending the card, or abrasion of the card surface are easily made to the metro card during its normal use. When a user uses a single-ride card to take public transportation, the user normally buys the single-ride card in small fares, and the staff also needs to count the small fares.

When a user uses a reusable pre-paid card to take public transportation, because the reusable pre-paid card is unregistered and its loss cannot be reported, it can bring the user financial loss if the card is lost. The user also needs to purchase, recharge, and get a refund for the prepaid card at specified locations, which makes it inconvenient to the user.

SUMMARY

To resolve problems in related technologies, the present disclosure provides a credit payment method and apparatus based on a mobile terminal embedded secure element (eSE).

According to a first aspect of the implementations of the present disclosure, a credit payment method based on a mobile terminal eSE is provided, and is applied to a mobile terminal, and the method includes: sending transaction information to a transaction terminal; receiving current payment transaction deduction information that is sent by the transaction terminal based on the transaction information; generating a payment authorization license based on the deduction information and the transaction information by using an eSE of the mobile terminal; and sending the payment authorization license to the transaction terminal, so that the transaction terminal completes the current payment transaction based on the received payment authorization license.

After sending transaction information to a transaction terminal, the method further includes: receiving an application public key certificate reading instruction sent by the transaction terminal; and sending an application public key certificate to the transaction terminal based on the application public key certificate reading instruction.

Further, generating a payment authorization license by using an eSE of the mobile terminal includes: generating signature data based on the deduction information by using an application private key stored on the eSE; generating a transaction authentication code (TAC) based on the deduction information and the transaction information by using a TAC sub-key that is pre-generated on the eSE; and using the signature data and the TAC as the payment authorization license.

Further, the payment method is applied to payment for bus traveling, and the transaction information includes a payment card number, an available limit, and an entrance/exit flag.

Further, the deduction information includes a deduction amount, a date and time of the current payment transaction, an entrance/exit flag of the current payment transaction sign, and station information of the current payment transaction.

The method further includes: subtracting the deduction amount from the available limit in the transaction information based on the deduction amount in the current payment transaction deduction information, to obtain a current available limit; and using the current available limit as an available limit corresponding to a user in the mobile terminal.

According to a second aspect of the implementations of the present disclosure, a credit payment method based on a mobile terminal eSE is provided, and is applied to a transaction terminal, and the method includes: receiving transaction information sent by a mobile terminal; generating current payment transaction deduction information based on the transaction information; sending the deduction information to the mobile terminal; and when receiving a payment authorization license, determining, based on the payment authorization license, that the current payment transaction is completed.

After receiving transaction information sent by a mobile terminal, the method further includes: sending an application public key certificate reading instruction to the mobile terminal; receiving an application public key certificate sent by the predetermined mobile terminal; verifying the application public key certificate by using a credit authorization public key locally stored on the transaction terminal; and when an application public key is restored from the application public key certificate during verification, performing the step of generating current payment transaction deduction information.

Further, the payment authorization license includes signature data and a TAC, and the determining, based on the payment authorization license, that the current payment transaction is completed includes: verifying the signature data by using the application public key; generating a transaction log when the signature data is verified; and sending the transaction log to a predetermined server, so that the predetermined server deducts a corresponding amount of money from a user account corresponding to the mobile terminal based on the transaction log, where the transaction log includes a deduction amount, a transaction date, a transaction time, a transaction terminal ID, a payment card number, an available limit, and a TAC.

Further, the method is applied to payment for bus traveling, and the transaction information includes at least an available limit and an entrance/exit flag, and the method further includes: determining whether the available limit in the transaction information is greater than or equal to a predetermined threshold; and if the available limit is greater than or equal to the predetermined threshold, checking whether the entrance/exit flag in the transaction information is an exited state; and if the entrance/exit flag in the transaction information is an exited state, performing the step of sending an application public key certificate reading instruction to the mobile terminal.

According to a third aspect of the implementations of the present disclosure, a credit payment method based on a mobile terminal eSE is provided, and is applied to a mobile terminal, and the method includes: separately generating an application public key and an application private key by using an eSE of the mobile terminal; sending the application public key to a predetermined server, so that the predetermined server signs the application public key by using a locally stored authorization private key to generate an application public key certificate; obtaining the public key certificate sent by the predetermined server, and saving both the application public key certificate and the application private key on the eSE; sending a credit payment data obtaining request to the predetermined server; and receiving credit payment data sent by the predetermined server, and enabling a credit payment function of the mobile terminal based on the credit payment data by using the eSE.

The method further includes: obtaining device parameter information of the mobile terminal; sending the device parameter information to the predetermined server, so that the predetermined server determines, based on the received device parameter information, whether the mobile terminal meets a hardware condition for enabling credit payment; checking whether the credit payment enabling information sent by the predetermined server is received; and when the credit payment enabling information sent by the predetermined server is received, determining that the mobile terminal meets the hardware condition for enabling credit payment, and performing the step of separately generating an application public key and an application private key.

The method further includes: obtaining user identity information; sending the user identity information to the predetermined server, so that the predetermined server determines, based on the received user identity information, whether the mobile terminal meets a security authentication condition for enabling credit payment; checking whether security authentication success information sent by the predetermined server is received; and when the security authentication success information sent by the predetermined server is received, determining that the mobile terminal meets the security authentication condition for enabling credit payment, and performing the step of separately generating an application public key and an application private key.

The method further includes: sending a request for obtaining a predetermined installation file to the predetermined server, where the predetermined installation file includes a credit payment application and a registration script; obtaining the credit payment application and the registration script that are sent by the predetermined server; and separately installing the credit payment application and the registration script on the eSE, and performing the step of separately generating an application public key and an application private key.

According to a fourth aspect of the implementations of the present disclosure, a credit payment method based on a mobile terminal eSE is provided, and is applied to a server, and the method includes: receiving an application public key sent by a mobile terminal; signing the application public key by using an authorization private key locally stored on the server to generate an application public key certificate; sending the application public key certificate to the mobile terminal, so that the mobile terminal saves the received application public key certificate on an eSE; receiving a credit payment data obtaining request sent by the mobile terminal; generating credit payment data corresponding to the mobile terminal based on the credit payment data obtaining request, and sending the credit payment data to the mobile terminal, so that the mobile terminal enables a credit payment function of the mobile terminal based on the received credit payment data.

The method further includes: receiving device parameter information sent by the mobile terminal; determining, based on the device parameter information, whether the mobile terminal meets a hardware condition for enabling credit payment; and when the mobile terminal meets the hardware condition for enabling credit payment, sending credit payment enabling information to the mobile terminal, and performing the step of receiving an application public key sent by a mobile terminal.

The method further includes: receiving user identity information sent by the mobile terminal; determining, based on the user identity information, whether the mobile terminal meets a security authentication condition for enabling credit payment; and when the mobile terminal meets the security authentication condition for enabling credit payment, sending security authentication success information to the mobile terminal, and performing the step of receiving an application public key sent by a mobile terminal.

The method further includes: receiving a request sent by the mobile terminal for obtaining a predetermined installation file, where the predetermined installation file includes a credit payment application and a registration script; and separately sending the credit payment application and the registration script to the mobile terminal based on the request for obtaining the predetermined installation file, and performing the step of receiving an application public key sent by a mobile terminal.

According to a fifth aspect of the implementations of the present disclosure, a credit payment apparatus based on a mobile terminal eSE is provided, and the apparatus includes: a transaction information sending unit, configured to send transaction information to a transaction terminal; a deduction information receiving unit, configured to receive current payment transaction deduction information that is sent by the transaction terminal based on the transaction information; a payment authorization license generation unit, configured to generate a payment authorization license based on the deduction information and the transaction information by using an eSE of the mobile terminal; and a payment authorization license sending unit, configured to send the payment authorization license to the transaction terminal, so that the transaction terminal completes the current payment transaction based on the received payment authorization license.

The apparatus further includes: an application public key certificate reading instruction receiving unit, configured to receive an application public key certificate reading instruction sent by the transaction terminal; and an application public key certificate sending unit, configured to send an application public key certificate to the transaction terminal based on the application public key certificate reading instruction.

Further, the payment authorization license generation unit includes: a signature data generation module, configured to generate signature data based on the deduction information by using an application private key stored on the eSE; a TAC generation module, configured to generate a TAC based on the deduction information and the transaction information by using a TAC sub-key that is pre-generated on the eSE; and a payment authorization license determining module, configured to use the signature data and the TAC as a payment authorization license.

Further, when the payment apparatus is applied to payment for bus traveling, the transaction information includes a payment card number, an available limit, and an entrance/exit flag.

Further, the deduction information includes a deduction amount, a date and time of the current payment transaction, an entrance/exit flag of the current payment transaction sign, and station information of the current payment transaction.

The apparatus further includes: a current available limit generation unit, configured to subtract a deduction amount from the available limit in the transaction information based on the deduction amount in the current payment transaction deduction information to obtain a current available limit; and an available limit determining unit, configured to use the current available limit as an available limit corresponding to a user in the mobile terminal.

According to a sixth aspect of the implementations of the present disclosure, a credit payment apparatus based on a mobile terminal eSE is provided, and is applied to a transaction terminal, and the apparatus includes: a transaction information receiving unit, configured to receive transaction information sent by a mobile terminal; a deduction information generation unit, configured to generate current payment transaction deduction information based on the transaction information; a deduction information sending unit, configured to send the deduction information to the mobile terminal; and a payment transaction completion determining unit, configured to: when a payment authorization license is received, determine, based on the payment authorization license, that the current payment transaction is completed.

The apparatus further includes: an application public key certificate reading instruction sending unit, configured to send an application public key certificate reading instruction to the mobile terminal; an application public key certificate receiving unit, configured to receive an application public key certificate sent by the predetermined mobile terminal; and an application public key certificate verification unit, configured to verify the application public key certificate by using a credit authorization public key locally stored on the transaction terminal.

Further, the credit authorization license includes signature data and a TAC, and the credit transaction completion determining unit includes: a signature data verification module, configured to verify the signature data by using the application public key; a transaction log generation module, configured to generate a transaction log when the signature data is verified; and a transaction log sending module, configured to send the transaction log to a predetermined server, so that the predetermined server deducts a corresponding amount of money from a user account corresponding to the mobile terminal based on the transaction log, where the transaction log includes a deduction amount, a transaction date, a transaction time, a transaction terminal ID, a payment card number, an available limit, and a TAC.

Further, the apparatus is applied to payment for bus traveling, the transaction information includes at least an available limit and an entrance/exit flag, and the apparatus further includes a threshold determining unit and an entrance/exit flag determining unit; where the threshold determining unit is configured to determine whether the available limit in the transaction information is greater than or equal to a predetermined threshold; the entrance/exit flag determining unit is configured to: when the available limit is greater than or equal to the predetermined threshold, check whether the entrance/exit flag in the transaction information is an exited state; and the application public key certificate reading instruction sending unit is further configured to send the application public key certificate reading instruction to the mobile terminal when the entrance/exit flag in the transaction information is an exited state.

According to a seventh aspect of the implementations of the present disclosure, a credit payment apparatus based on a mobile terminal eSE is provided, and is applied to a mobile terminal, and the apparatus includes: a key generation unit, configured to separately generate an application public key and an application private key by using an eSE of the mobile terminal; an application public key sending unit, configured to send the application public key to a predetermined server, so that the predetermined server signs the application public key by using a locally stored authorization private key, to generate an application public key certificate; a public key certificate acquisition unit, configured to obtain a public key certificate sent by the predetermined server, and save both the application public key certificate and the application private key on the eSE; a credit payment data obtaining request sending unit, configured to send a credit payment data obtaining request to the predetermined server; and a credit payment data setting unit, configured to receive credit payment data sent by the predetermined server, and enable a credit payment function of the mobile terminal based on the credit payment data.

The apparatus further includes: a device parameter information acquisition unit, configured to obtain device parameter information of the mobile terminal; a device parameter information sending unit, configured to send the device parameter information to the predetermined server, so that the predetermined server determines, based on the received device parameter information, whether the mobile terminal meets a hardware condition for enabling credit payment; a credit payment enabling information check unit, configured to check whether credit payment enabling information sent by the predetermined server is received; and a credit payment hardware enabling condition, used to determine, when the credit payment enabling information sent by the predetermined server is received, that the mobile terminal meets the hardware condition for enabling credit payment.

The apparatus further includes: a user identity information acquisition unit, configured to obtain user identity information; a user identity information sending unit, configured to send the user identity information to the predetermined server, so that the predetermined server determines, based on the received user identity information, whether the mobile terminal meets a security authentication condition for enabling credit payment; a security authentication success information check unit, configured to check whether security authentication success information sent by the predetermined server is received; and a hardware enabling condition confirm unit, configured to determine, when the security authentication success information sent by the predetermined server is received, that the mobile terminal meets the security authentication condition for enabling credit payment.

The apparatus further includes: a predetermined installation file obtaining a request sending unit, configured to send a request for obtaining a predetermined installation file to the predetermined server, where the predetermined installation file includes a credit payment application and a registration script; a file acquisition unit, configured to obtain the credit payment application and the registration script that are sent by the predetermined server; and a file installation unit, configured to separately install the credit payment application and the registration script on the eSE.

According to an eighth aspect of the implementations of the present disclosure, a credit payment apparatus based on a mobile terminal eSE is provided, and is applied to a server, and the apparatus includes: an application public key receiving unit, configured to receive an application public key sent by a mobile terminal; an application public key certificate generation unit, configured to sign the application public key by using an authorization private key locally stored on the server, to generate an application public key certificate; an application public key certificate sending unit, configured to send the application public key certificate to the mobile terminal, so that the mobile terminal saves the received application public key certificate on an eSE; a credit payment data obtaining request receiving unit, configured to receive a credit payment data obtaining request sent by the mobile terminal; and a credit payment data generation unit, configured to generate credit payment data corresponding to the mobile terminal based on the credit payment data obtaining request, and send the credit payment data to the mobile terminal, so that the mobile terminal enables a credit payment function of the mobile terminal based on the received credit payment data.

The apparatus further includes: a device parameter information receiving unit, configured to receive device parameter information sent by the mobile terminal; a credit payment enabling hardware condition determining unit, configured to determine, based on the device parameter information, whether the mobile terminal meets a hardware condition for enabling credit payment; and a credit payment enabling information sending unit, configured to send credit payment enabling information to the mobile terminal when the mobile terminal meets the hardware condition for enabling credit payment.

The apparatus further includes: a user identity information receiving unit, configured to receive user identity information sent by the mobile terminal; a security authentication condition determining unit, configured to determine, based on the user identity information, whether the mobile terminal meets a security authentication condition for enabling credit payment; and a security authentication success information sending unit, configured to send security authentication success information to the mobile terminal when the user identity information meets the security authentication condition for enabling credit payment.

The apparatus further includes: a predetermined installation file obtaining request receiving unit, configured to receive a request sent by the mobile terminal for obtaining a predetermined installation file, where the predetermined installation file includes a credit payment application and a registration script; and an installation file sending unit, configured to separately send the credit payment application and the registration script to the mobile terminal based on the request for obtaining the predetermined installation file.

The technical solutions provided in the implementations of the present disclosure can include the following beneficial effects:

The credit payment method and apparatus based on a mobile terminal eSE provided in the present disclosure can be applied to a mobile terminal and a transaction terminal. After enabling a payment application, a user can use the mobile terminal to complete offline credit payment with the transaction terminal. As such, a payment transaction can be made quickly and securely, and online payment is not required, so that a problem in related technologies that the user needs to use cash, a metro card, etc. to implement a payment transaction function when taking a public transportation vehicle can be effectively resolved.

It should be understood that the previous general description and the following detailed description are merely examples and explanations, and cannot limit the present disclosure.

BRIEF DESCRIPTION OF DRAWINGS

The accompanying drawings here are incorporated in the specification, constitute a part of the specification, show implementations that are in accordance with the present disclosure, and are used with the specification to explain a principle of the present disclosure.

DESCRIPTION OF IMPLEMENTATIONS

Example implementations are described in detail here, and examples of the example implementations are illustrated in the accompanying drawings. When the following description relates to the accompanying drawings, unless otherwise specified, same numbers in different accompanying drawings represent same or similar elements. Implementations described in the following example implementations do not represent all implementations consistent with the present disclosure. Instead, they are examples of apparatus and methods consistent with some aspects of the present disclosure that are described in detail in the appended claims.

Mobile payment is also referred to as mobile phone payment. A user can use a mobile terminal to pay for a purchased product or service. The mobile terminal can communicate with a transaction terminal through near field communication (NFC), to make a payment transaction. NFC, also referred to as short range communication, is a short range high-frequency radio communication technology that allows electronic devices to exchange data through non-contact point-to-point data transmission. The secure nature of NFC technology shows good application prospect.

In the payment technology field, many mobile terminals with a transaction payment function have an embedded secure element (eSE) chip. The eSE chip can exist in a SIM card integrated chip, be integrated into a mobile terminal, or exist in an SD integrated chip. The eSE chip is a secured chip that is mainly responsible for data security storage, data encryption, etc. of the mobile terminal. For better description, in implementations of the present disclosure, the eSE chip is illustrated as being integrated into the mobile terminal. But it does not limit the present disclosure. The eSE on the mobile terminal is equivalent to a Java card, and complies with the JAVACARD specification and the GP specification. The Java card is an open standard formulated by Sun for a smart card development platform.

To facilitate better understanding and implementation of the present disclosure by a person skilled in the art, a correlation among a mobile terminal, a transaction terminal, and a server involved in the implementations of the present disclosure is first described briefly, such as how to transmit and process data between the terminals. Due to the wide application of the present disclosure, such as in mobile payment, for better description, the present disclosure is illustrated by a scenario where customers use mobile phone credit payment to purchase public transportation fares.

Figure 1:
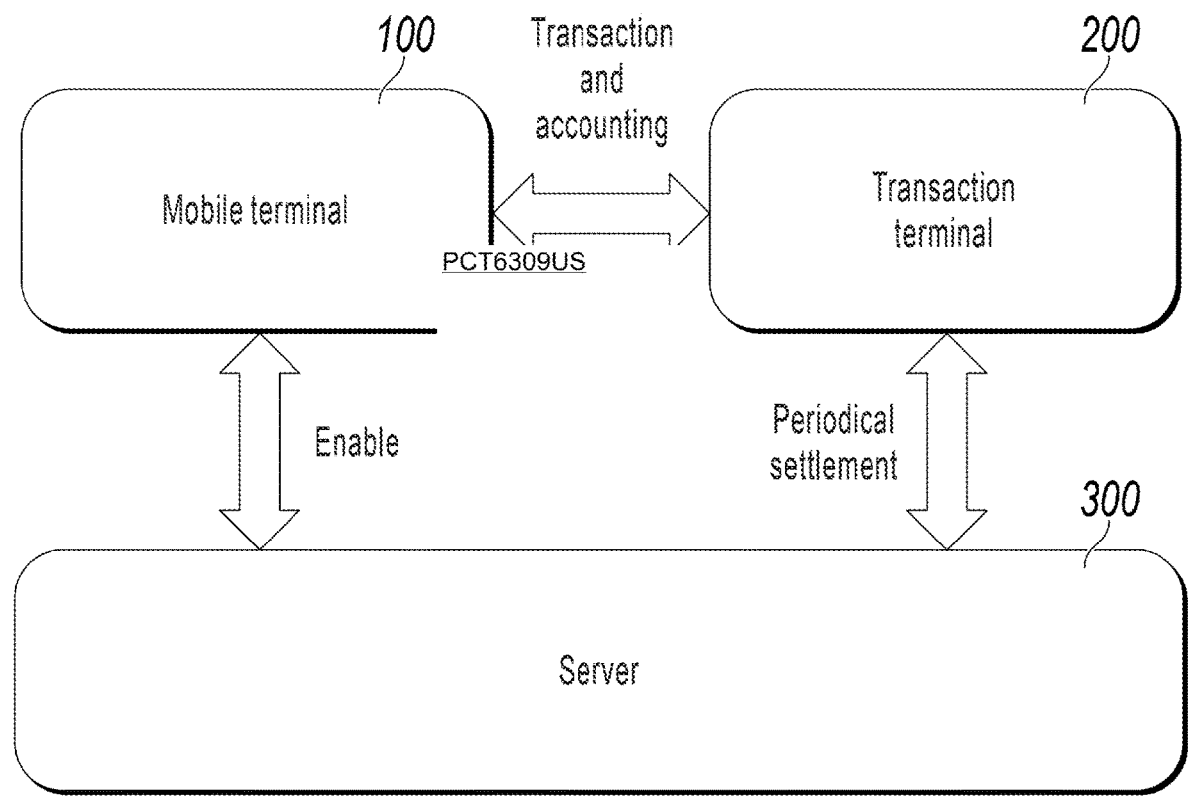
FIG. 1 is a schematic diagram illustrating a credit authorization system, according to an implementation of the present disclosure.

As shown in FIG. 1, a credit authorization system provided in an implementation of the present disclosure includes a mobile terminal 100, a transaction terminal 200, and a server 300. The mobile terminal 100 can be a mobile phone with a payment transaction function. The transaction terminal 200 can be a bus gate, and the bus gate is a POS terminal used in a bus system or a subway system. The server 300 is a server in a credit authorization system. Before making a payment transaction with the transaction terminal 200 by using the mobile terminal 100, a user needs to first enable a credit payment transaction function of the mobile terminal 100 by using the server 300, then can make the payment transaction with the transaction terminal 200 by using the mobile terminal 100. In addition, the transaction terminal 200 periodically uploads a transaction log of the mobile terminal 100 to the server 300, and the server 300 deducts a corresponding amount of money from an account corresponding to the mobile terminal 100, and pays the money to a bus company.

In the implementation provided in the present disclosure, two applications can be installed on the mobile terminal. One is a credit payment application which is installed on an eSE chip of the mobile terminal and can be a credit payment application applet. For a Java card, Sun sets Applet as the object for running on its platform. The other application on the mobile terminal can be a credit authorization system application. Functions of the previous two applications on the mobile terminal can be implemented by using one application. It is not limited in the present implementation.

The transaction terminal 200 uses a strict identity security authentication mechanism, to ensure that only a user who passes identity security authentication and has enough credit limit can enable a bus credit payment application.

The credit payment application applet is installed on the eSE chip of the mobile terminal 100 with an NFC function. During personalization, it generates an application public and private key pair, and saves the application private key on the eSE chip. A security mechanism of the eSE chip ensures that data of the eSE chip is not stolen in any circumstance. An application public key is signed as an application public key certificate by using a private key in the credit authorization system, and is saved on the eSE chip. A public key in the credit authorization system is provided for the transaction terminal 200, and a storage location is determined by the transaction terminal 200. Because it is a public key, no mandatory requirement is imposed on security.

When providing a credit payment transaction, after reading the application public key certificate in the credit payment application, the transaction terminal 200 verifies the application public key certificate by using the public key in the credit authorization system, to restore the application public key. The credit payment application applet on the eSE chip generates a payment authorization license by using the application private key. The transaction terminal 200 verifies the payment authorization license by using the application public key, and then checks a security factor in the authorization license after the verification passes. After confirming security, the transaction terminal 200 performs credit accounting, and then settles a corresponding credit account at a specified time. To ensure payment security, when a quantity of use times, a limit, or an interval time exceeds a specified threshold, the mobile terminal needs to connect to a network to verify user identity information, and grant authorization again.

Data interaction between the mobile terminal 100 and the transaction terminal 200 during a payment transaction is first described below.

Figure 2:
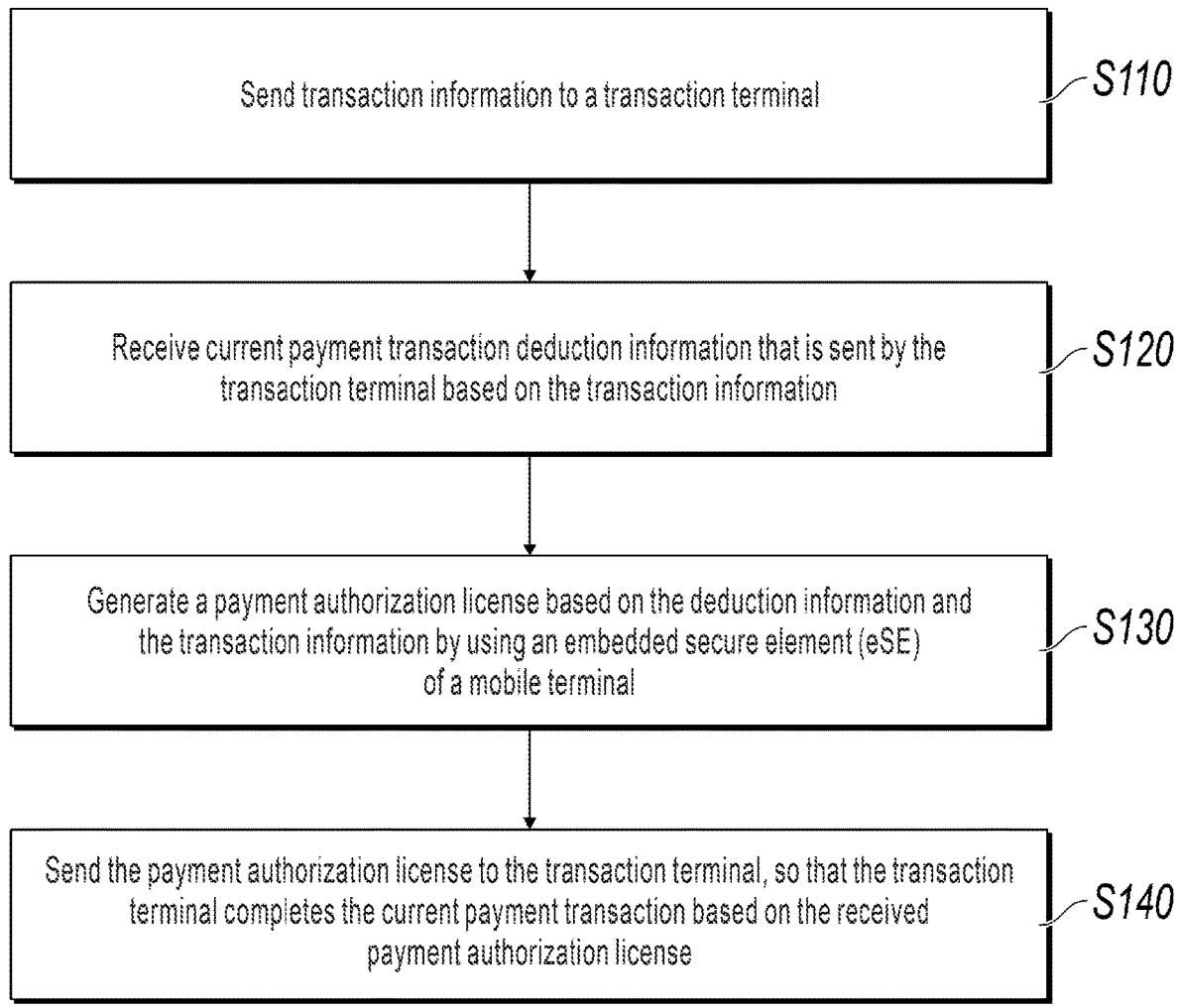
FIG. 2 is a flowchart illustrating a credit payment method based on a mobile terminal embedded secure element (eSE), according to an example implementation.

To resolve a related technical problem, an implementation of the present disclosure provides a credit payment method based on a mobile terminal eSE, applied to a mobile terminal side. As shown in FIG. 2, the method can include the following steps:

In step S110, send transaction information to a transaction terminal.

For better description, the transaction terminal is a bus gate.

When a user holds a mobile terminal and approaches the bus gate to make a payment transaction, because the bus gate can generate a radio frequency field, when the mobile terminal approaches the bus gate, the mobile terminal can detect the radio frequency field generated by the bus gate, and then can detect the bus gate. When the mobile terminal detects the bus gate, the mobile terminal sends transaction information to the bus gate.

In step S120, receive current payment transaction deduction information that is sent by the transaction terminal based on the transaction information.

After receiving an application public key certificate sent by the mobile terminal, the bus gate verifies the application public key certificate, generates the current payment transaction deduction information, and sends the deduction information to the mobile terminal. The mobile terminal receives the deduction information sent by the bus gate.

In step S130, generate a payment authorization license based on the deduction information and the transaction information by using an eSE of the mobile terminal.

The payment authorization license generated by the mobile terminal includes: signature data and transaction authentication code (TAC).

In step S140, send the payment authorization license to the transaction terminal, so that the transaction terminal completes the current payment transaction based on the received payment authorization license.

After receiving the payment authorization license sent by the mobile terminal, the bus gate verifies the payment authorization license. If the license is verified, it is determined that the current payment transaction is completed.

In the credit payment method based on a mobile terminal eSE provided in the present implementation of the present disclosure, when the user makes a payment transaction with the transaction terminal by using the mobile terminal, the mobile terminal successively sends, based on the relevant instruction information sent by the transaction terminal, the transaction information, the application public key certificate, and the generated payment authorization license to the transaction terminal, and the transaction terminal completes the current payment transaction based on the information sent by the mobile terminal. Compared with a problem in related technologies, in the credit payment method based on a mobile terminal eSE provided in the present implementation of the present disclosure, when making a transaction with the transaction terminal by using the mobile terminal, the user can separately make the mobile terminal and the transaction terminal be offline, so that credit accounting is used for a user account of the mobile terminal in a subsequent payment transaction process. The account is settled only after the user makes purchase by using the mobile terminal, so that the user can be protected from a capital loss risk caused by using cash in a transaction.

Figure 3:
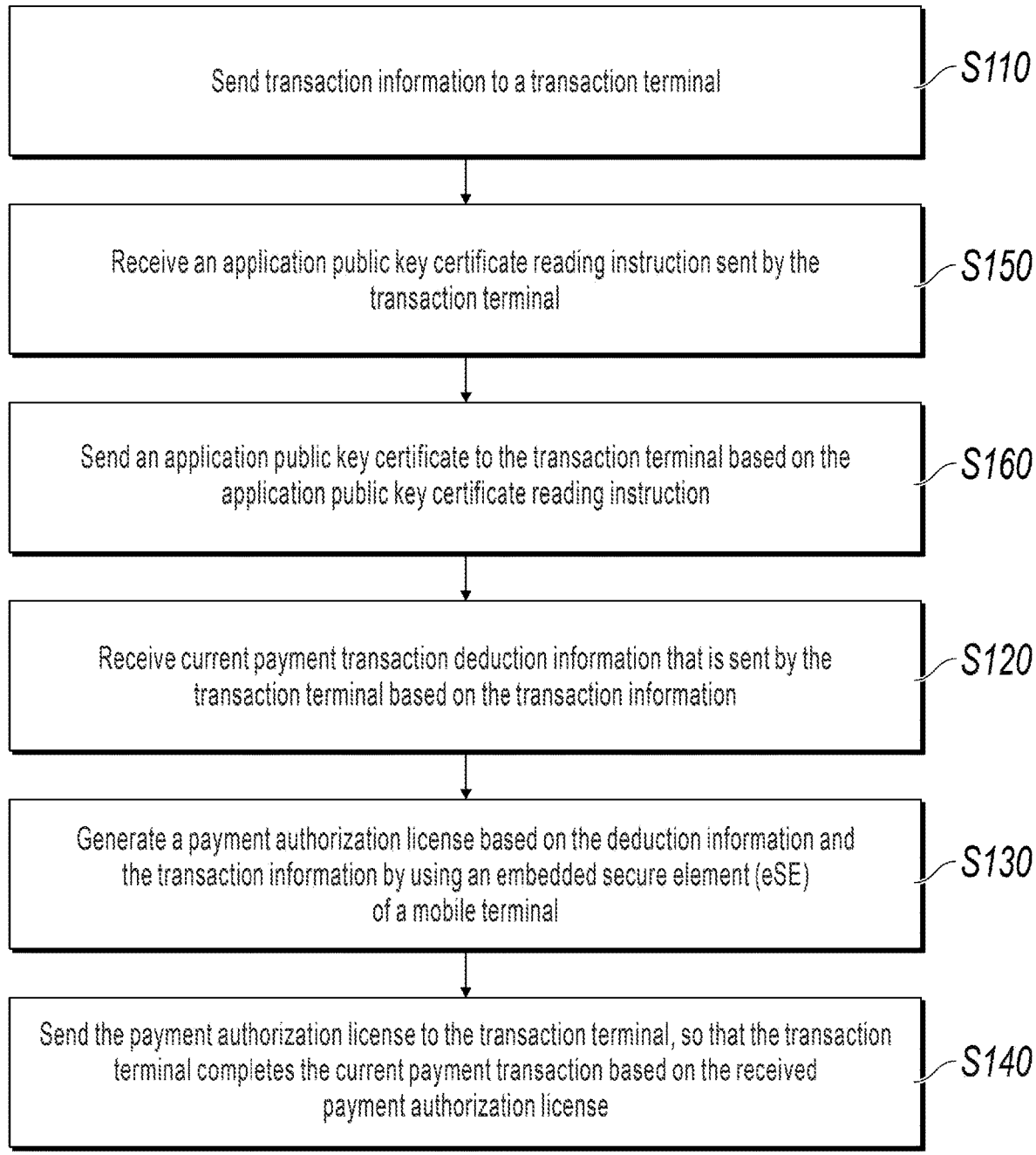
FIG. 3 is a flowchart illustrating a credit payment method based on a mobile terminal eSE, according to an example implementation.

As refinement of the method in FIG. 2, in another implementation of the present disclosure, as shown in FIG. 3, after step S110, the method can further include the following steps:

In step S150, receive an application public key certificate reading instruction sent by the transaction terminal.

After the bus gate receives the transaction information sent by the mobile terminal, the bus gate sends the application public key certificate reading instruction to the mobile terminal after processing and confirming the transaction information. After the mobile terminal receives the application public key certificate reading instruction sent by the bus gate, a credit payment application on the mobile terminal reads an application public key certificate that is pre-generated and stored on the eSE of the mobile terminal.

In step S160, send an application public key certificate to the transaction terminal based on the application public key certificate reading instruction.

The credit payment application on the mobile terminal sends the read application public key certificate to the bus gate based on the application public key certificate reading instruction.

Figure 4:
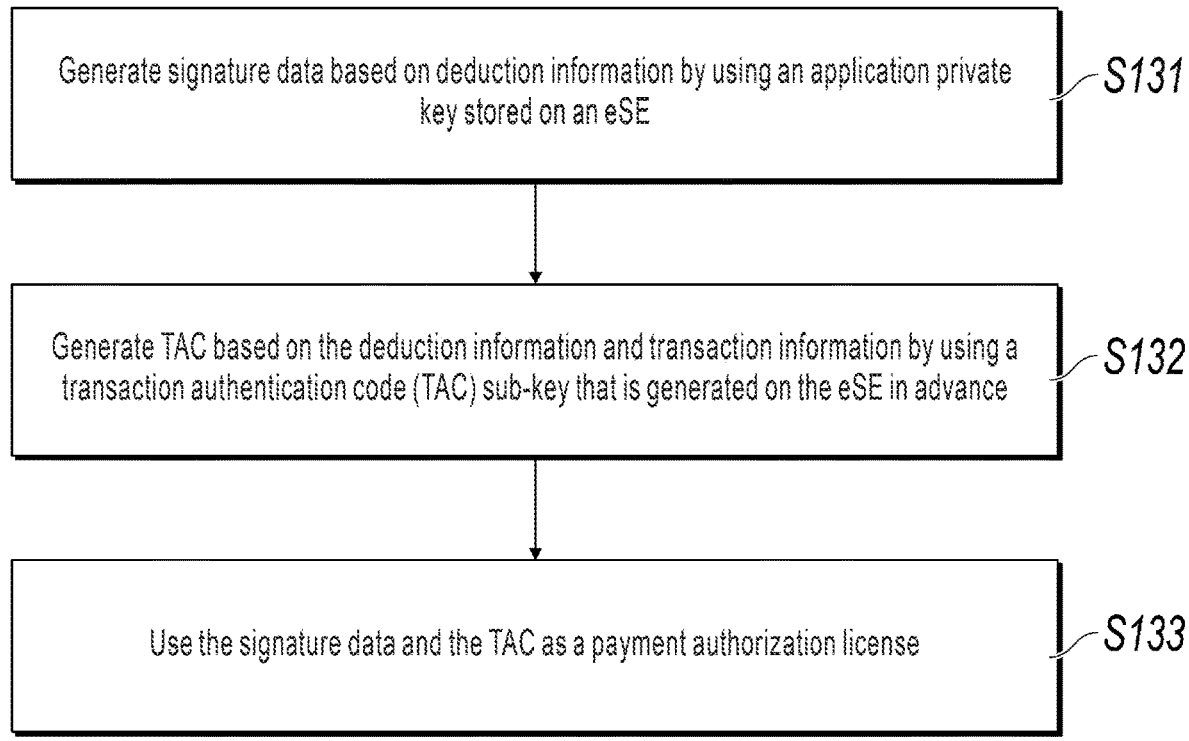
FIG. 4 is a flowchart illustrating step S130 in FIG. 2.

To describe in detail in the present implementation of the present disclosure, how the mobile terminal generates the payment authorization license, so the transaction terminal can complete the current payment transaction based on the authorization license sent by the mobile terminal, as refinement of the method in FIG. 2, in another implementation of the present disclosure, as shown in FIG. 4, step S130 can further include the following steps:

In step S131, generate signature data based on the deduction information by using an application private key stored on the eSE.

The application private key is pre-generated and stored on the eSE of the mobile terminal. The credit payment application signs the deduction information by using the application private key, to generate the signature data. The deduction information includes a deduction amount, a date and time of the current payment transaction, an entrance/exit flag of the current payment transaction sign, and station information of the current payment transaction.

In step S132, generate a TAC based on the deduction information and the transaction information by using a TAC sub-key that is pre-generated on the eSE.

The credit payment application on the mobile terminal encrypts the deductible amount, the date of the current payment transaction, the time of the current payment transaction, the payment card number, the available limit, and a credit limit based on the deduction information and the transaction information, to generate the TAC. The credit limit is a maximum available amount authorized by a credit authorization system to the user in an offline mode.

The deduction information includes: the deduction amount, the date of the current payment transaction, the time of the current payment transaction, the entrance/exit flag of the current payment transaction sign, and the station information of the current payment transaction.

In step S133, use the signature data and the TAC as the payment authorization license.

The credit payment application can send the signature data and the TAC to the bus gate separately as the payment authorization license, or can send the signature data and the TAC together to the bus gate as a credit authorization license.

In addition, when the payment method is applied to payment for bus traveling, the transaction information includes a payment card number, an available limit, and an entrance/exit flag. The payment card number is a unique character code generated by the credit authorization system for each user's credit payment application. The available limit is an amount of money that the user can use currently. The TAC sub-key is obtained by a server in the credit authorization system based on a card number hash by using a TAC parent private key.

Figure 5:
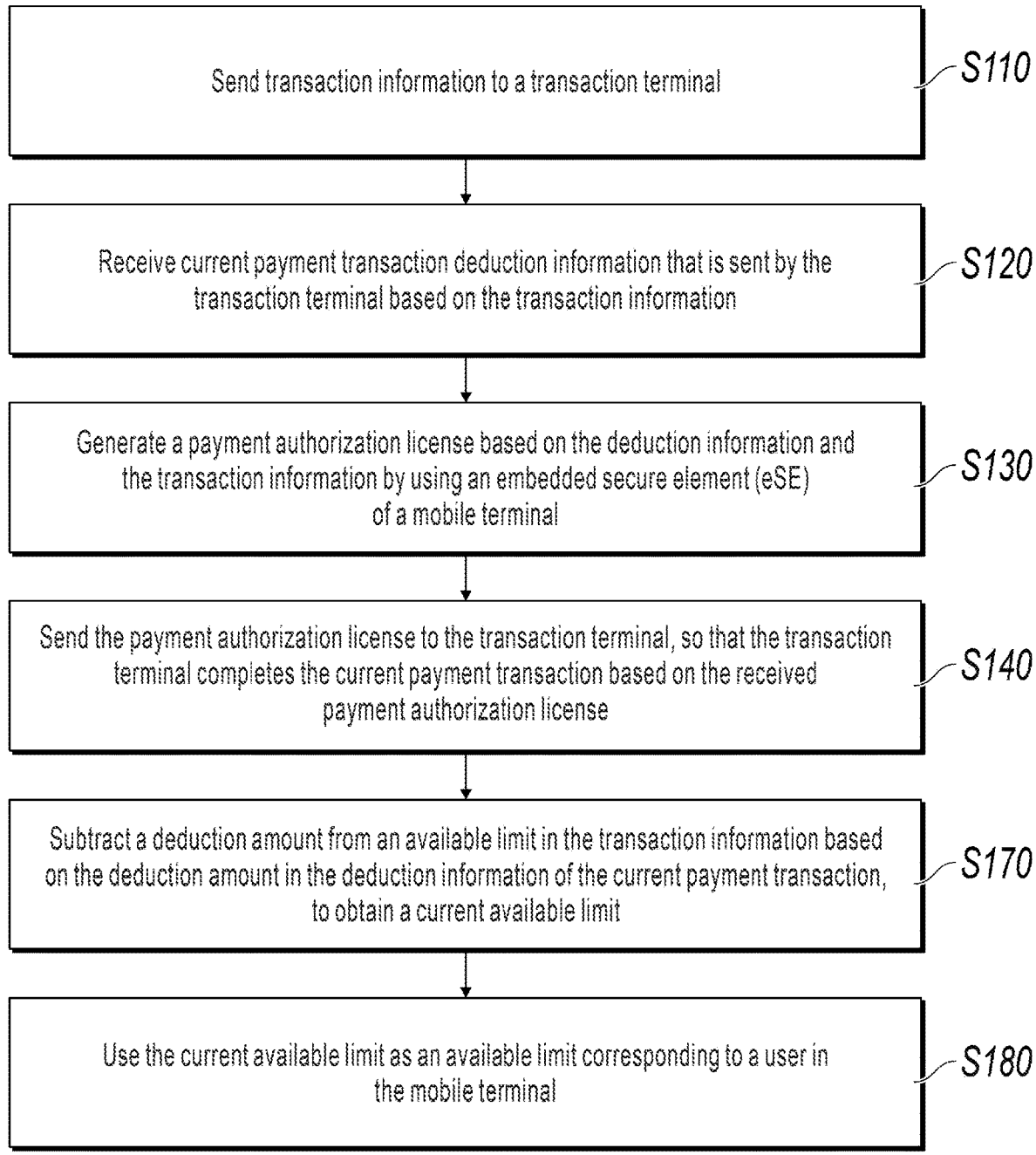
FIG. 5 is a flowchart illustrating a credit payment method based on a mobile terminal eSE, according to an example implementation.

As refinement of the method in FIG. 2, in another implementation of the present disclosure, as shown in FIG. 5, the method can further include the following steps:

In step S170, subtract the deduction amount from the available limit in the transaction information based on the deduction amount in the current payment transaction deduction information, to obtain a current available limit.

In step S180, use the current available limit as an available limit corresponding to a user in the mobile terminal.

Figure 6:
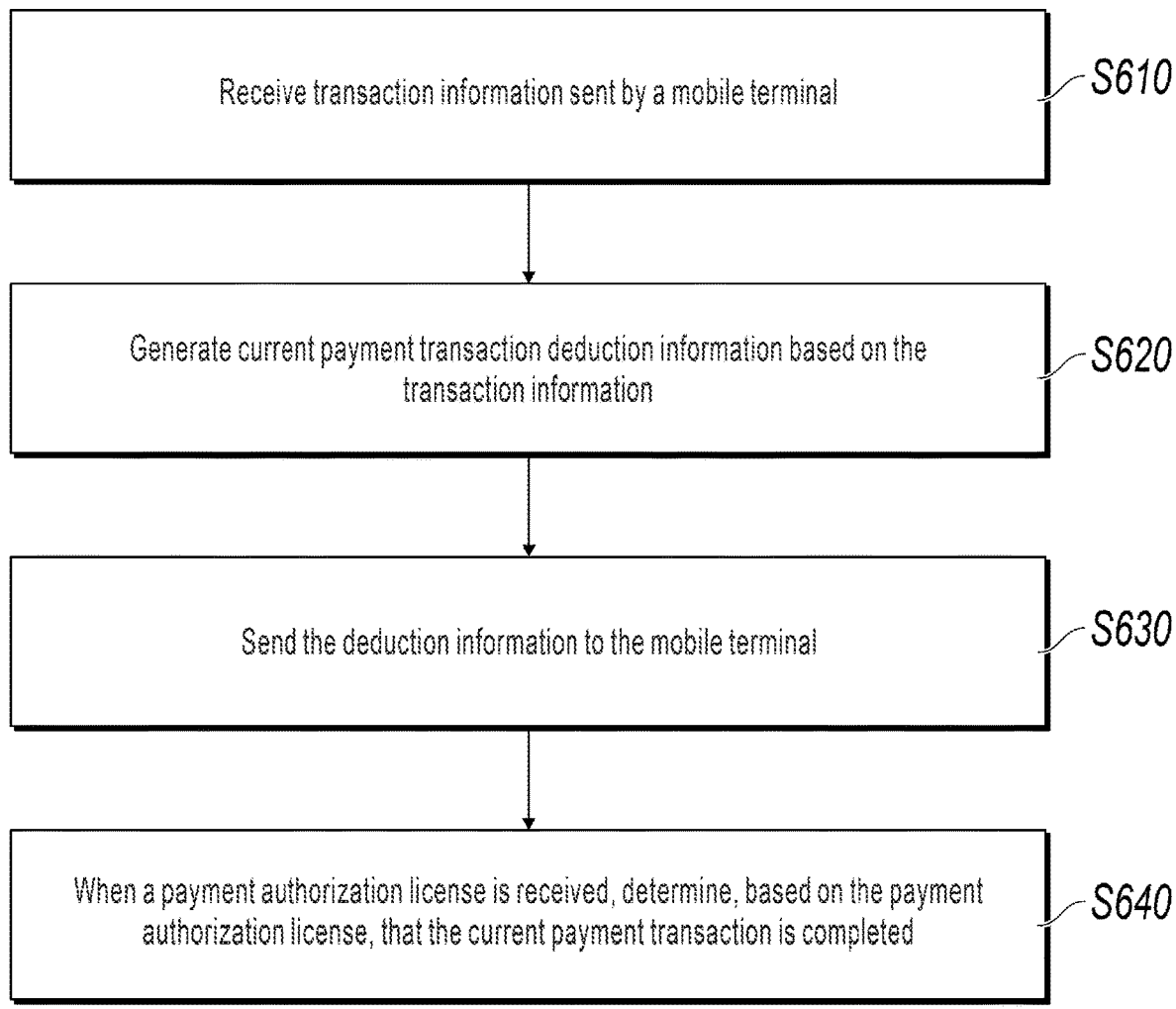
FIG. 6 is a flowchart illustrating a credit payment method based on a mobile terminal eSE, according to another example implementation.

To describe a transaction payment process between the mobile terminal and the transaction terminal in detail, an implementation of the present disclosure provides an execution procedure of a credit payment method based on mobile terminal eSE on a transaction terminal side. As shown in FIG. 6, the method can include the following steps:

In step S610, receive transaction information sent by a mobile terminal.

A bus gate receives the transaction information sent by the mobile terminal. The transaction information includes a payment card number, an available limit, an entrance/exit flag, and information about a previous transaction. The bus gate checks content of the transaction information, for example, checking information such as an available limit of an account corresponding to the mobile terminal, the entrance/exit flag, etc. When the content is verified as qualified, the bus gate sends an application public key certificate reading instruction to the mobile terminal.

In step S620, generate current payment transaction deduction information based on the transaction information.

The bus gate verifies an application public key certificate sent by the mobile terminal. If the verification fails, the current payment transaction ends. If an application public key is restored from the application public key certificate, the verification succeeds, and the current payment transaction deduction information is generated. Notably, the current payment transaction deduction information can also be referred to as a deduction instruction, so the mobile terminal can generate a payment authorization license after receiving the deduction information (deduction instruction) sent by the bus gate.

The current payment transaction deduction information includes a deduction amount, a date and time of the current payment transaction, an entrance/exit flag of the current payment transaction sign, and station information of the current payment transaction. The deduction amount is calculated by the bus gate based on information such as the entrance/exit flag of the current payment transaction.

In step S630, send the deduction information to the mobile terminal.

The bus gate sends the generated deduction information to the mobile terminal, so that after receiving the deduction information, the mobile terminal generates the payment authorization license based on the deduction information and the transaction information by using an eSE of the mobile terminal.

In step S640, when the payment authorization license is received, determine, based on the payment authorization license, that the current payment transaction is completed.

The payment authorization license includes: signature data and TAC. The bus gate verifies the signature data in the payment authorization license. If the verification fails, the current payment transaction ends. If the verification succeeds, a transaction log of the current payment transaction is recorded.

Figure 7:
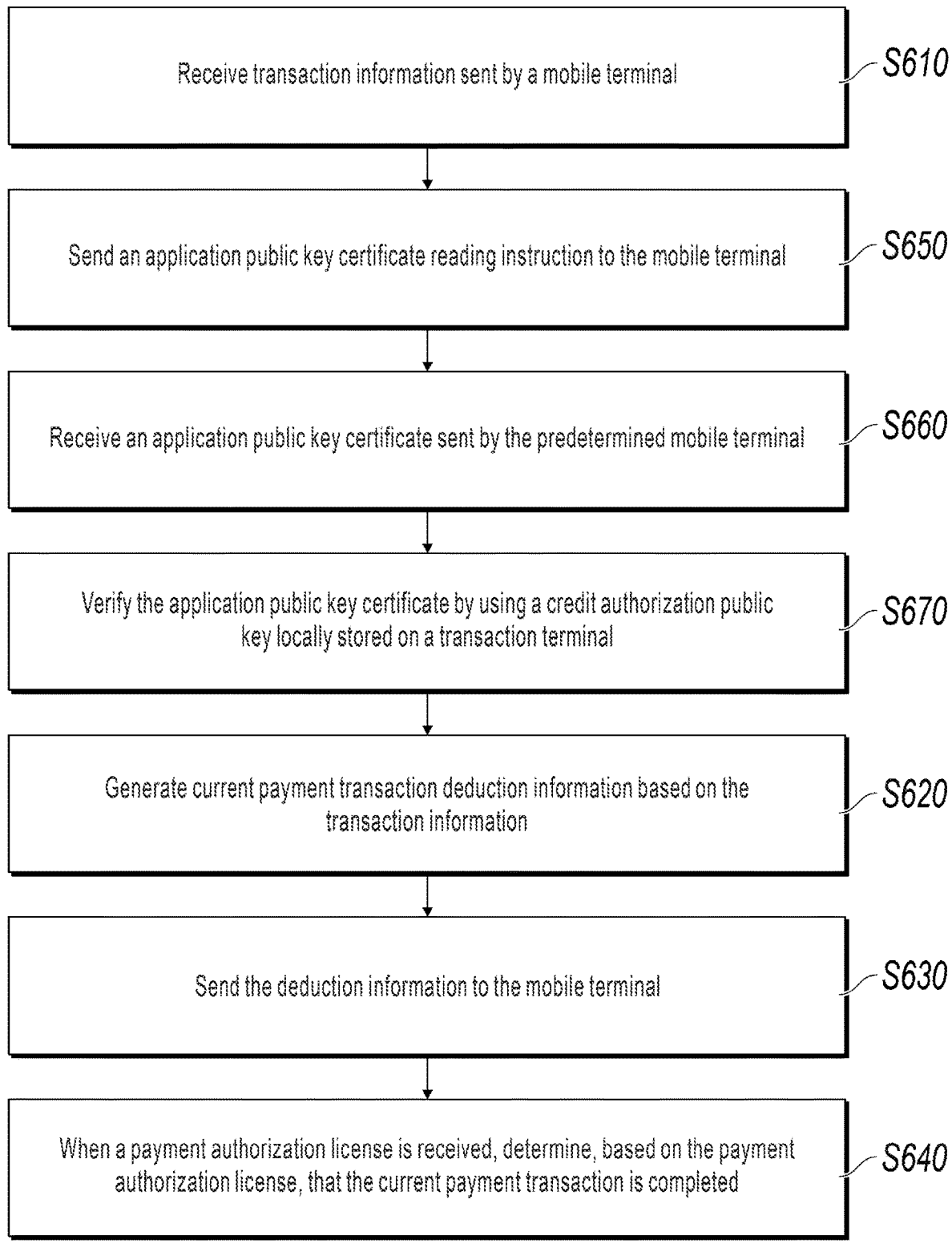
FIG. 7 is a flowchart illustrating a credit payment method based on a mobile terminal eSE, according to another example implementation.

As refinement of the method in FIG. 6, as shown in FIG. 7, in another implementation of the present disclosure, after step S610, the method can further include the following steps:

In step S650, send an application public key certificate reading instruction to the mobile terminal.

In step S660, receive an application public key certificate sent by the predetermined mobile terminal.

After the bus gate sends the application public key certificate reading instruction to the mobile terminal, the mobile terminal sends the application public key certificate to the bus gate based on the instruction, and the bus gate receives the application public key certificate sent by the mobile terminal.

In step S670, verify the application public key certificate by using a credit authorization public key locally stored on a transaction terminal.

To determine whether the received application public key certificate is correct, and to use related information in the public key certificate, the application public key certificate needs to be verified by using the credit authorization public key. The credit authorization public key can be pre-stored on the bus gate.

When the application public key is restored from the application public key certificate during verification, step S620 is performed.

Figure 8:
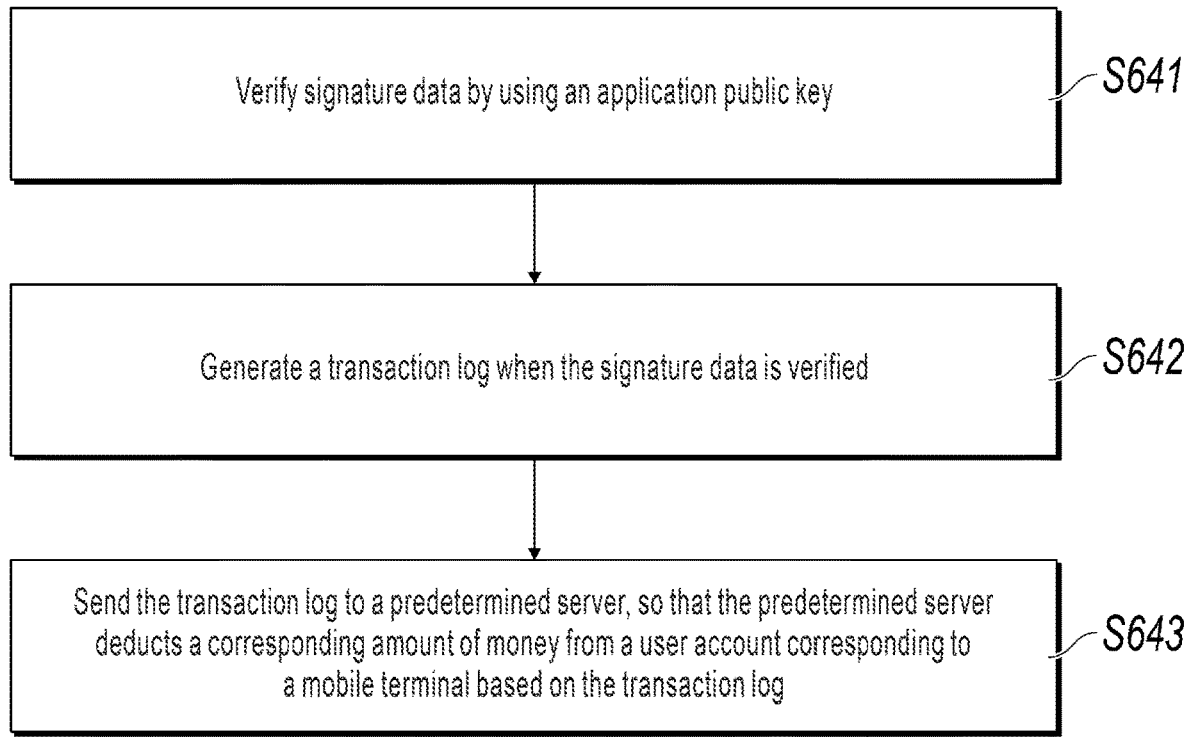
FIG. 8 is a flowchart illustrating step S640 in FIG. 6.

To describe in detail how the transaction terminal completes the current payment transaction based on the authorization license sent by the mobile terminal in the present implementation of the present disclosure, as refinement of the method in FIG. 6, in another implementation of the present disclosure, as shown in FIG. 8, step S640 can further include the following steps:

In step S641, verify the signature data by using the application public key.

The application public key is restored by the bus gate from the payment authorization license sent by the mobile terminal, and the application public key checks whether related information in the signature data matches corresponding information in the application public key. If they match, the verification succeeds.

In step S642, generate a transaction log when the signature data is verified.

After the bus gate verifies the signature data, the transaction log of the current payment is generated. The transaction log includes: a deduction amount, a transaction date, a transaction time, a transaction terminal ID, a payment card number, an available limit, and a TAC.

In step S643, send the transaction log to a predetermined server, so that the predetermined server deducts a corresponding amount of money from a user account corresponding to the mobile terminal based on the transaction log.

Figure 9:
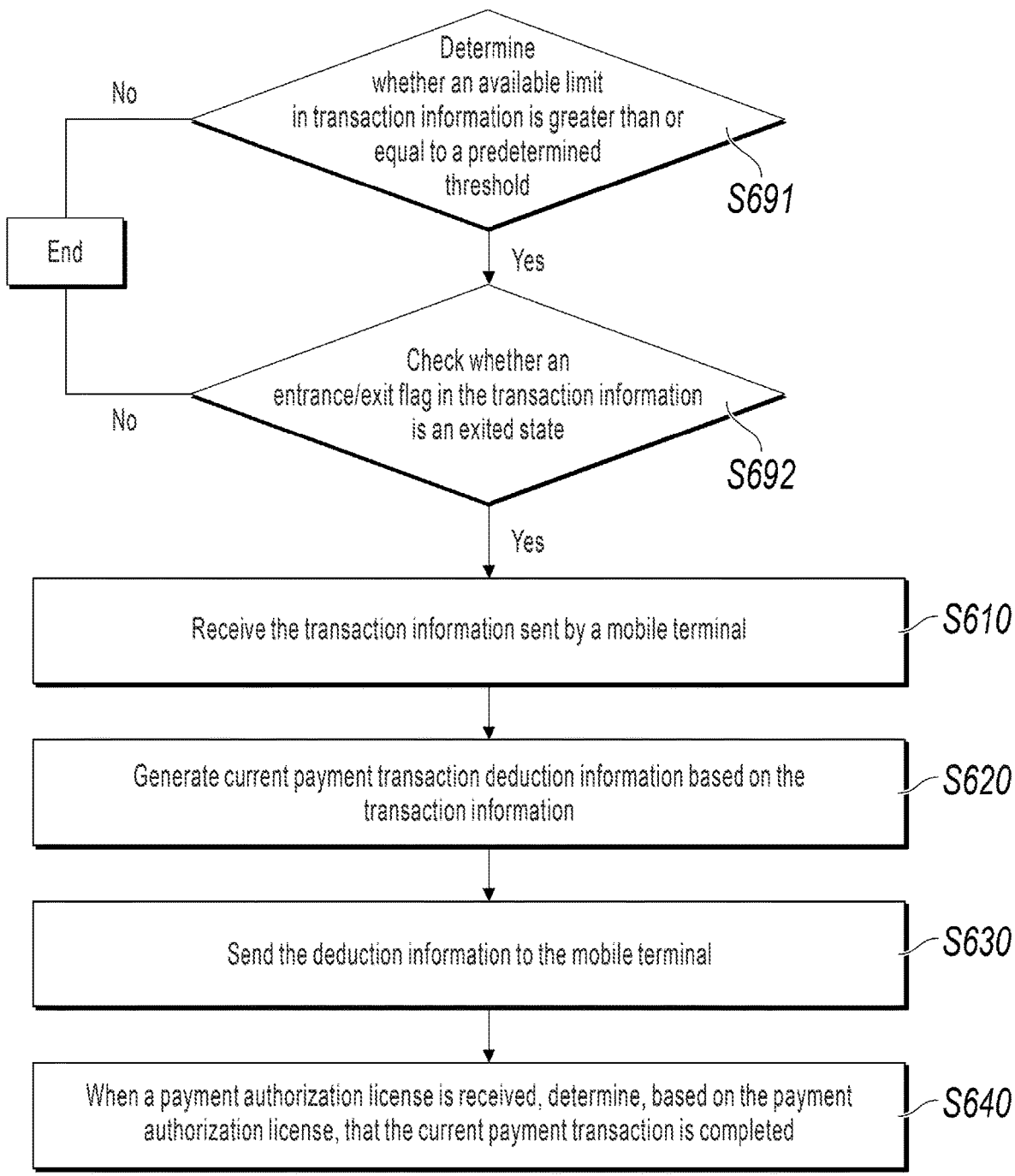
FIG. 9 is a flowchart illustrating a credit payment method based on a mobile terminal eSE, according to another example implementation.

As shown in FIG. 9, in another implementation of the present disclosure, the credit payment method based on a mobile terminal eSE provided in the implementation of the present disclosure is applied to payment for bus traveling. Before step S610, an execution procedure on the transaction terminal side can further include the following steps:

In step S691, determine whether the available limit in the transaction information is greater than or equal to a predetermined threshold.

If the available limit is greater than or equal to the predetermined threshold, step S692 is performed.

In step S692, check whether the entrance/exit flag in the transaction information is an exited state.

If the entrance/exit flag in the transaction information is an exited state, step S610 is performed.

Step S691 is mainly to enable the bus gate to check, based on the transaction information sent by the mobile terminal, whether an available limit of a user account corresponding to the mobile terminal is enough to pay for the current payment transaction. If the available limit is insufficient, the current payment transaction is rejected. If the available limit is sufficient, the bus gate checks whether the entrance/exit flag in the transaction information is 0. If the entrance/exit flag is not 0, the current payment transaction is rejected. If the entrance/exit flag is 0, the current payment transaction is continued. Notably, when the entrance/exit flag is 1, it indicates that the user who holds the mobile terminal is in an entered state, and then the current payment transaction is rejected; when the entrance/exit flag is 0, it indicates that the user who holds the mobile terminal is in an exited state, and an account can be settled, so the current payment transaction is made.

The transaction information includes a payment card number, an available limit, an entrance/exit flag, and information about a previous transaction.

The previous implementation describes in detail the execution procedures on the mobile terminal side and the transaction terminal side in the credit payment method based on a mobile terminal eSE provided in the present disclosure during a payment transaction. Before the payment transaction is made between the mobile terminal and the transaction terminal, data needs to be interacted between the mobile terminal and a server in a credit authorization system, so as to enable a payment transaction function of the mobile terminal. Execution procedures on a mobile terminal side and a server side when a payment transaction function of the mobile terminal is enabled are described in detail below.

Figure 10:
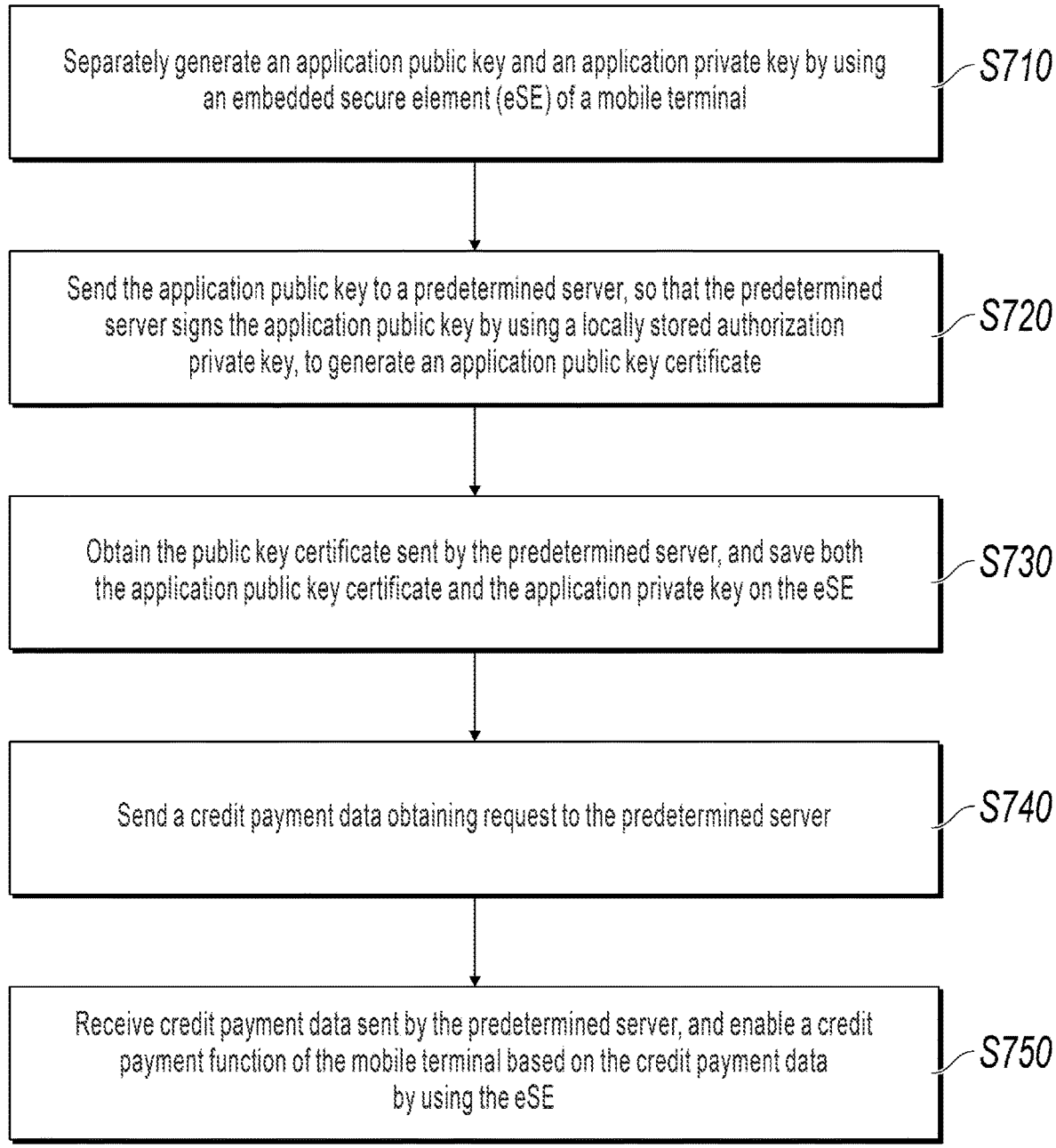
FIG. 10 is a flowchart illustrating a credit payment method based on a mobile terminal eSE, according to another example implementation.

As shown in FIG. 10, when a mobile terminal enables a payment transaction function, an execution procedure on a mobile terminal side in a credit payment method based on a mobile terminal eSE provided in an implementation of the present disclosure can include the following steps:

In step S710, separately generate an application public key and an application private key by using an eSE of a mobile terminal.

A credit authorization system application installed on the mobile terminal sends a request to the eSE of the mobile terminal, to request the eSE to generate a pair of public key and private key, that is, the application public key and the application private key. The eSE sends the generated application public key to the credit authorization system application on the mobile terminal.

In step S720, send the application public key to a predetermined server, so that the predetermined server signs the application public key by using a locally stored authorization private key, to generate an application public key certificate.

After obtaining the application public key sent by the eSE, the credit authorization system application on the mobile terminal sends the application public key to the predetermined server, so that the predetermined server signs the application public key by using the locally stored authorization private key, to generate the application public key certificate. Notably, the predetermined server here can be a server in a credit authorization system.

In step S730, obtain the public key certificate sent by the predetermined server, and save both the application public key certificate and the application private key on the eSE. The eSE chip is a secure chip and mainly responsible for data security storage, data encryption, etc. of the mobile terminal, and can well store the application public key certificate and the application private key, to avoid a property loss caused to a user due to a data loss.

In step S740, send a credit payment data obtaining request to the predetermined server.

In step S750, receive credit payment data sent by the predetermined server, and enable a credit payment function of the mobile terminal based on the credit payment data by using the eSE.

Figure 11:
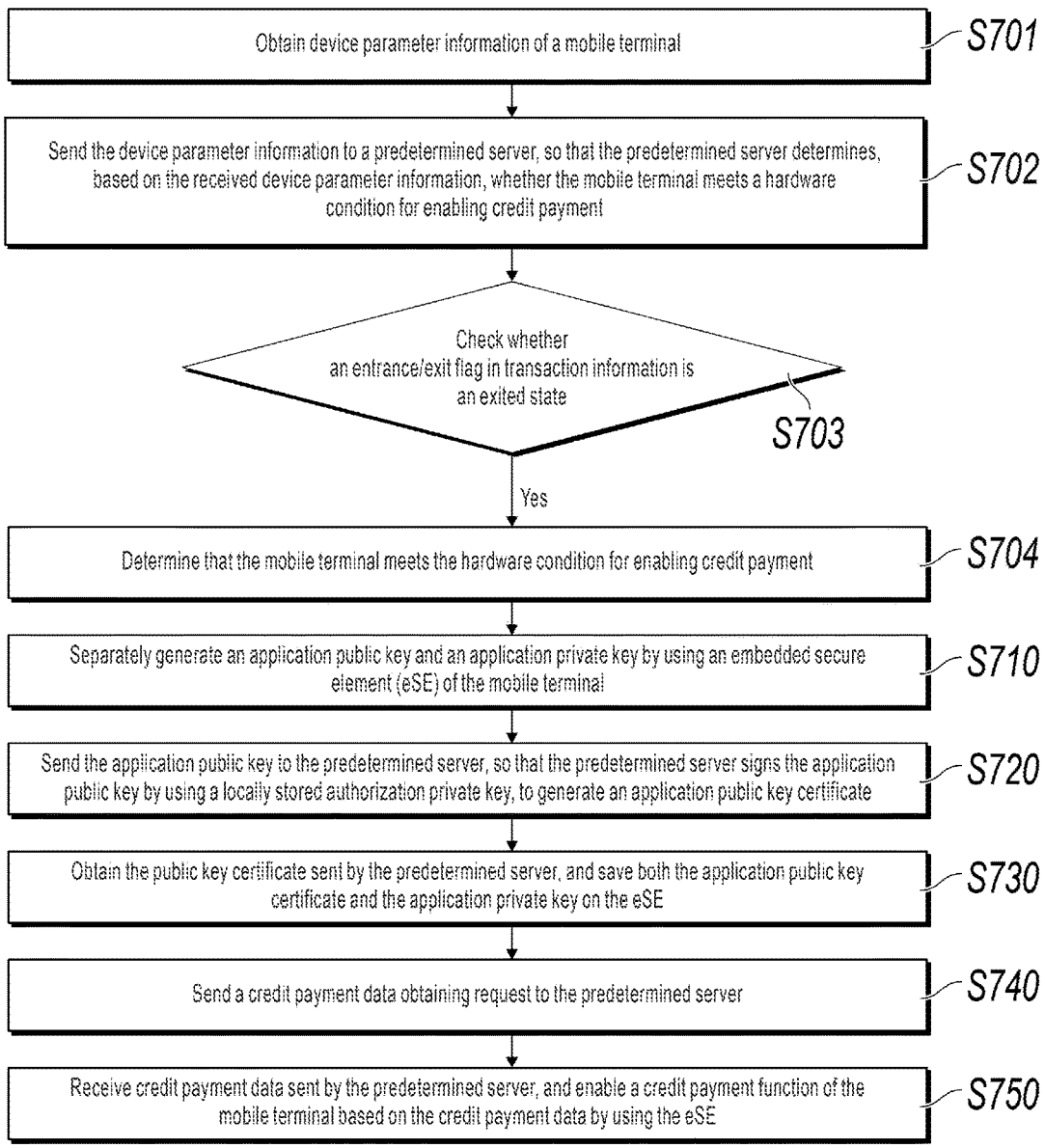
FIG. 11 is a flowchart illustrating a credit payment method based on a mobile terminal eSE, according to another example implementation.

In another implementation provided in the present disclosure, as shown in FIG. 11, before step S710, the method can further include the following steps:

In step S701, obtain device parameter information of the mobile terminal.

The device parameter information of the mobile terminal can be hardware information of the mobile terminal. Because the credit payment method provided in the present disclosure is based on the mobile terminal eSE chip, whether the mobile terminal has a satisfactory eSE chip needs to be checked first. Further, whether the mobile terminal has another hardware condition required by a payment transaction, such as whether it has an NFC function, also needs to be checked based on the device parameter information. Certainly, the device parameter information can also be information such as a device model, a ROM version, a system model (such as, Android), an application version, etc. of the mobile terminal.

In step S702, send the device parameter information to the predetermined server, so that the predetermined server determines, based on the received device parameter information, whether the mobile terminal meets a hardware condition for enabling credit payment.

The mobile terminal sends the obtained device parameter information of the mobile terminal to the server in the credit authorization system, so that the server determines, based on the received device parameter information, whether the mobile terminal meets the hardware condition for enabling credit payment.

In step S703, check whether credit payment enabling information sent by the predetermined server is received.

If the mobile terminal meets the hardware condition for enabling credit payment, the server end sends the credit payment enabling information to the mobile terminal. The credit payment enabling information can be a credit payment application enabling page.

If the mobile terminal does not meet the hardware condition for enabling credit payment, the server end does not send the credit payment enabling information to the mobile terminal.

When the credit payment enabling information sent by the predetermined server is received, step S704 is performed.

In step S704, determine that the mobile terminal meets the hardware condition for enabling credit payment, and step S710 is performed.

Figure 12:
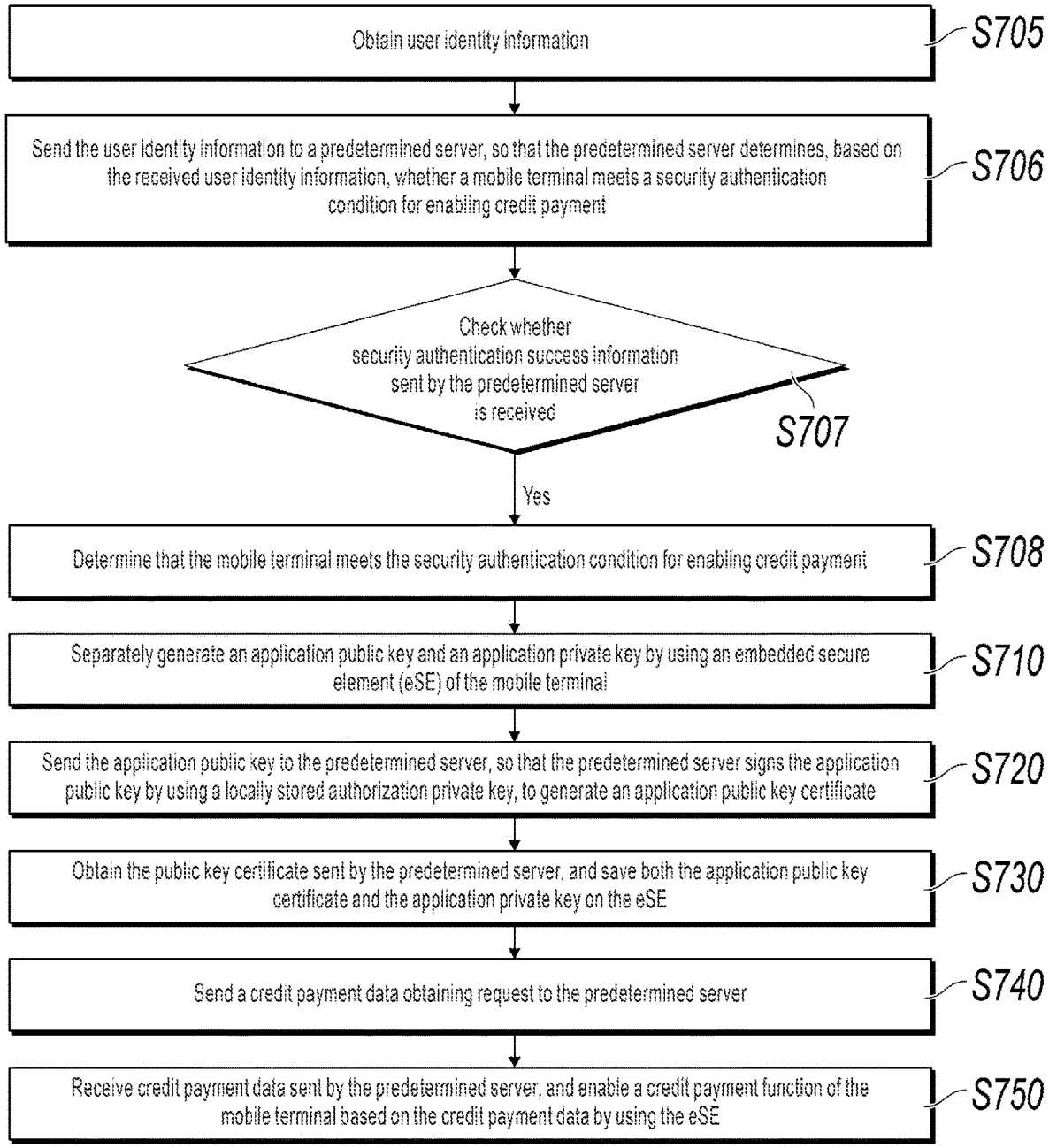
FIG. 12 is a flowchart illustrating a credit payment method based on a mobile terminal eSE, according to another example implementation.

In addition to checking whether the mobile terminal meets the hardware condition for enabling credit payment, based on FIG. 10, before step S710, as shown in FIG. 12, whether the mobile terminal meets a security authentication condition further needs to be checked. Therefore, in another implementation of the present disclosure, the credit payment method based on a mobile terminal eSE provided in the present disclosure can further include the following steps:

In step S705, obtain user identity information.

The user identity information can be information such as an identity card number, a name, a bank card number, a mailbox, etc. of the user.

In step S706, send the user identity information to the predetermined server, so that the predetermined server determines, based on the received user identity information, whether the mobile terminal meets a security authentication condition for enabling credit payment.

The mobile terminal sends the user identity information to the server in the credit authorization system, so that the server verifies the user identity information, for example, verifies whether the bank card number provides a service normally, whether a user account has a bad-credit transaction record, etc.

In step S707, check whether security authentication success information sent by the predetermined server is received.

After receiving the user information sent by the mobile terminal, the server end checks the user information, and if the mobile terminal meets the security authentication condition for enabling credit payment, the server end sends the security authentication success information to the mobile terminal.

When the security authentication success information sent by the predetermined server is received, step S708 is performed.

In step S708, determine that the mobile terminal meets the security authentication condition for enabling credit payment, and step S710 is performed.

When the mobile terminal receives the security authentication success information sent by the server end, the mobile terminal determines that the mobile terminal meets the security authentication condition for enabling credit payment.

When the mobile terminal does not receive the security authentication success information sent by the server end, the mobile terminal determines that the mobile terminal does not meet the security authentication condition for enabling credit payment.

Figure 13:
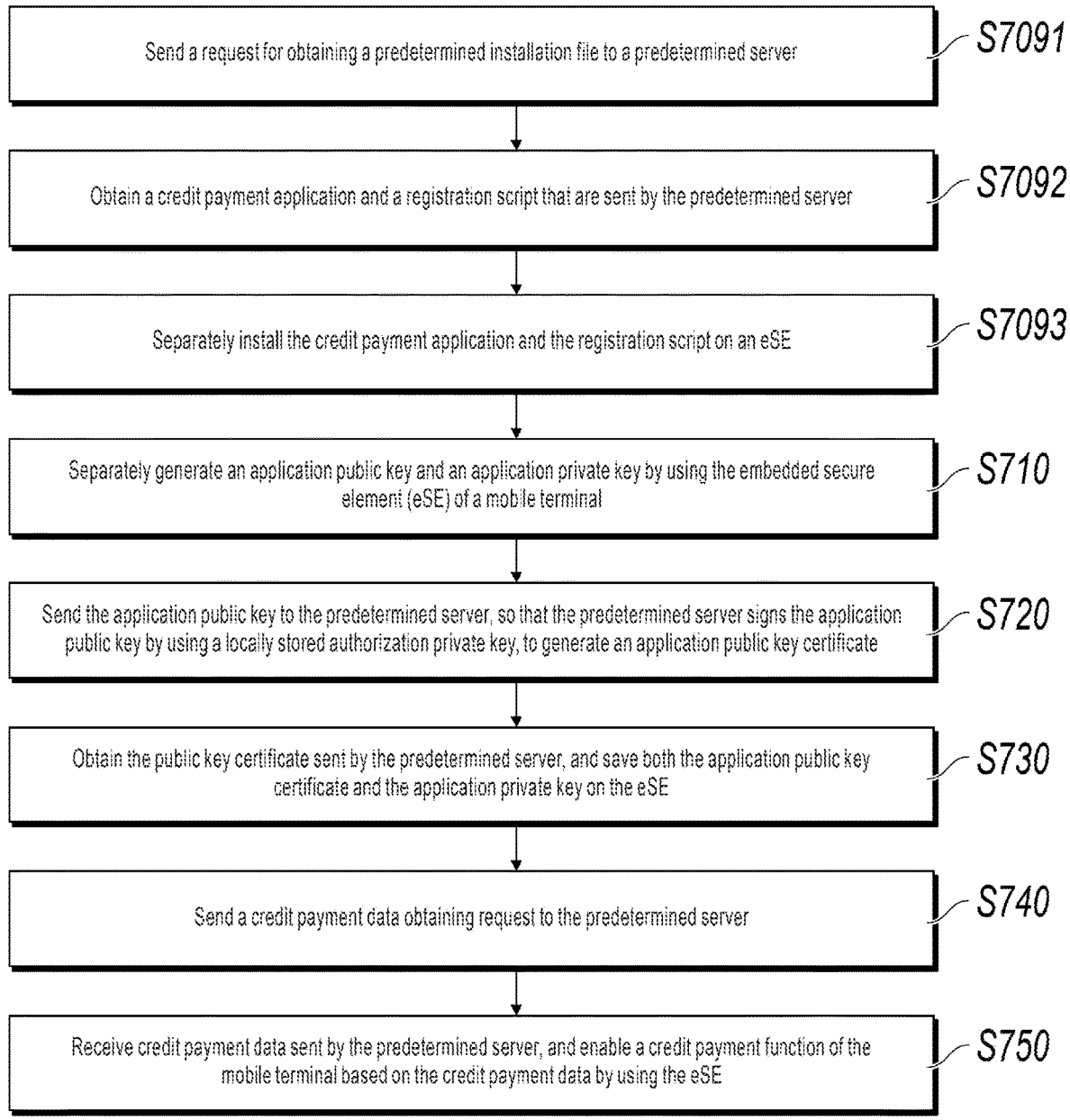
FIG. 13 is a flowchart illustrating a credit payment method based on a mobile terminal eSE, according to another example implementation.

Based on FIG. 10, before step S710, as shown in FIG. 13, a related application further needs to be installed on the mobile terminal. Therefore, the credit payment method based on a mobile terminal eSE provided in the present disclosure further includes the following steps:

In step S7091, send a request for obtaining a predetermined installation file to the predetermined server.

The predetermined installation file includes a credit payment application and a registration script.

In step S7092, obtain the credit payment application and the registration script that are sent by the predetermined server.

In step S7093, separately install the credit payment application and the registration script on the eSE, and step S710 is performed.

After the credit payment application and the registration script are separately installed on the eSE chip, user personalization of the mobile terminal is completed. As such, a procedure of enabling a credit payment function on the mobile terminal side ends. Based on the previous implementations, an execution procedure on a server side of the credit authorization system in which the mobile terminal enables the credit payment function is described in detail below.

Figure 14:
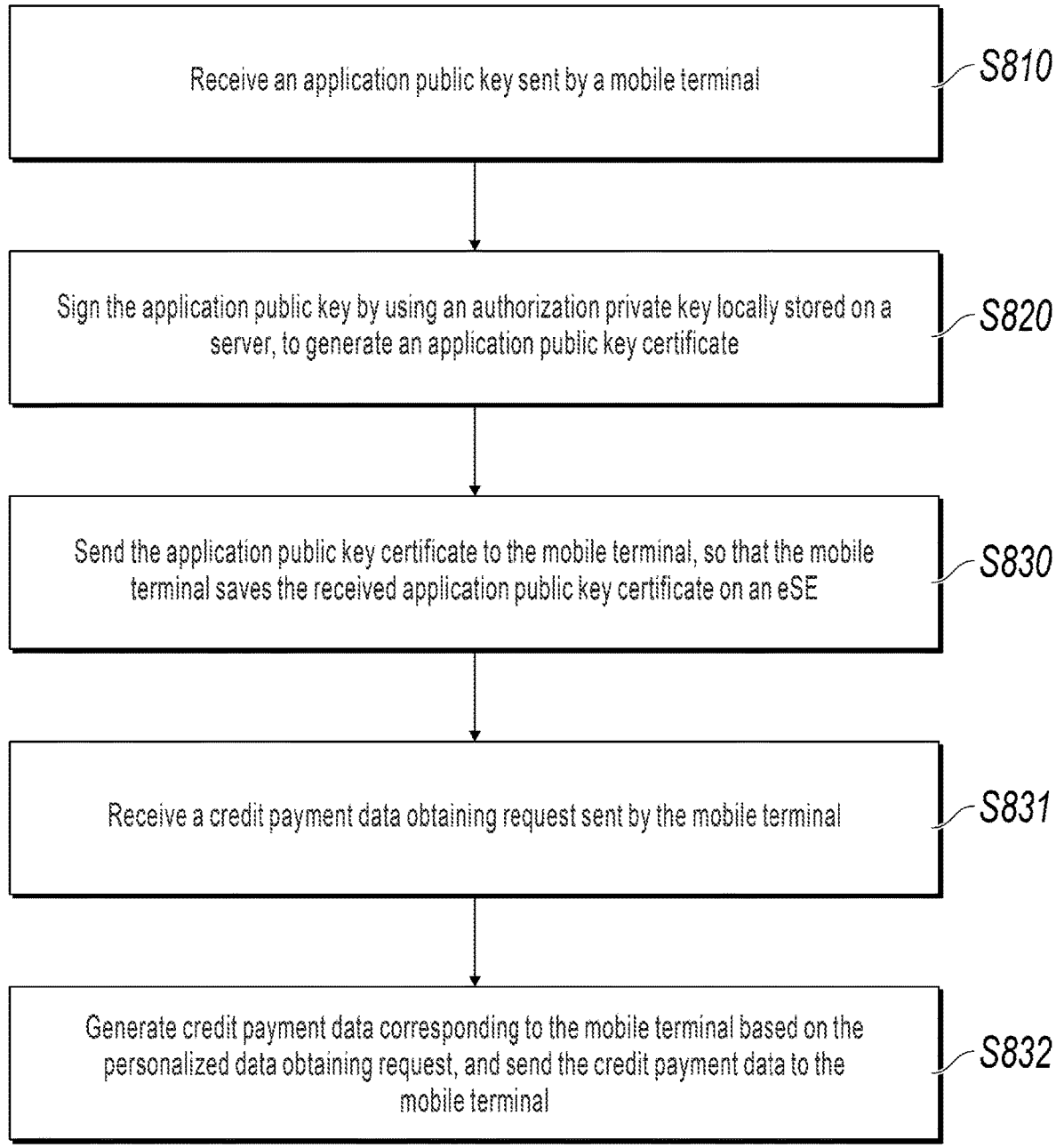
FIG. 14 is a flowchart illustrating a credit payment method based on a mobile terminal eSE, according to another example implementation.

In another implementation provided in the present disclosure, as shown in FIG. 14, an execution procedure of a server (a server end of a credit authorization system) in the credit payment method based on a mobile terminal eSE provided in the present disclosure can include the following steps:

In step S810, receive an application public key sent by a mobile terminal.

After the mobile terminal generates the application public key and an application private key, it sends the application public key to a server in a credit authorization system, and the server receives the application public key sent by the mobile terminal.

In step S820, sign the application public key by using an authorization private key locally stored on the server, to generate an application public key certificate.

The credit authorization private key is a private key pre-generated in the credit authorization system, and the server signs, by using the private key, the application public key sent by the mobile terminal, to generate the application public key certificate.

In step S830, send the application public key certificate to the mobile terminal, so that the mobile terminal saves the received application public key certificate on an eSE.

After generating the application public key certificate, the server in the credit authorization system returns the application public key certificate to the mobile terminal, so that after receiving the application public key certificate sent by the server, the mobile terminal saves the application public key certificate on the eSE chip.

The server in the credit authorization system not only can return the application public key certificate to the mobile terminal, but is also responsible for checking, based on information sent by the mobile terminal, whether the mobile terminal meets a condition for enabling credit payment.

In step S831, receive a credit payment data obtaining request sent by the mobile terminal.

Credit payment data can be a personalized script, and the personalized script includes a payment card number, a credit limit, an available limit, and a TAC sub-key. The payment card number is a unique character code generated by the credit authorization system for a credit payment application of each user. The available limit is an amount of money that the user can use currently. The TAC sub-key is obtained by the server in the credit authorization system based on a card number hash by using a TAC parent private key.

In step S832, generate credit payment data corresponding to the mobile terminal based on the credit payment data obtaining request, and send the credit payment data to the mobile terminal.

As such, the mobile terminal enables a credit payment function of the mobile terminal based on the received credit payment data.

Figure 15:
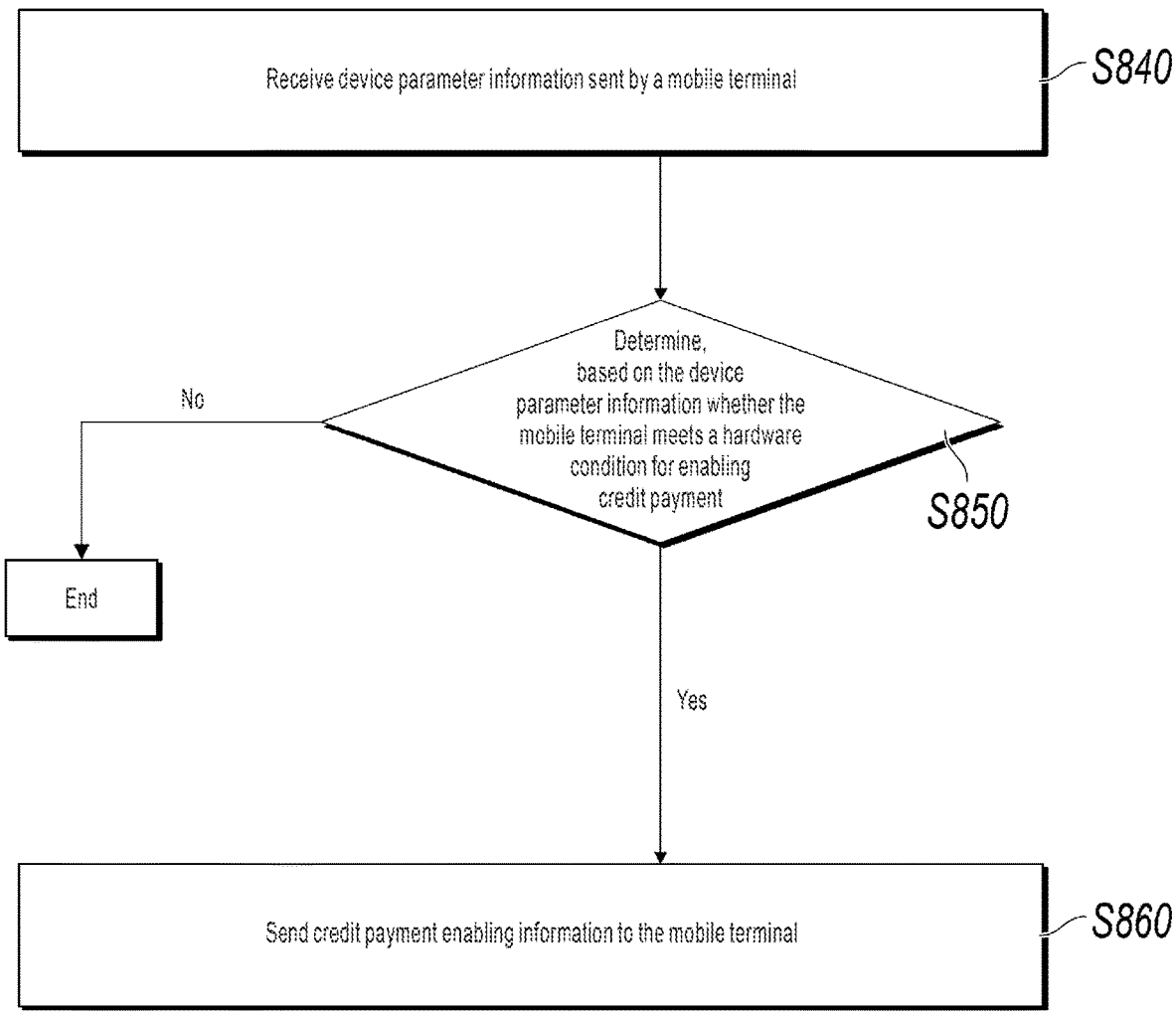
FIG. 15 is a flowchart illustrating a credit payment method based on a mobile terminal eSE, according to another example implementation.

Based on FIG. 14, as shown in FIG. 15, in another implementation provided in the present disclosure, the server (the server end of the credit authorization system) determines, based on device parameter information sent by the mobile terminal, whether the mobile terminal meets a hardware condition for enabling credit payment. Therefore, before step S810, the credit payment method based on a mobile terminal eSE provided in the implementation of the present disclosure can further include the following steps:

In step S840, receive device parameter information sent by the mobile terminal.

In a process of enabling the credit payment function, the mobile terminal can communicate with the server in the credit authorization system through a network or other similar methods, and the server in the credit authorization system can receive the device parameter information sent by the mobile terminal.

In step S850, determine, based on the device parameter information, whether the mobile terminal meets a hardware condition for enabling credit payment.

The parameter information sent by the mobile terminal can be information such as a device model, a ROM version, a system model (such as, Android), an application version, etc. of the mobile terminal. The server can check, based on the information sent by the mobile terminal, whether the mobile terminal has an eSE chip, whether the mobile terminal has an NFC function, etc.

When the mobile terminal meets the hardware condition for enabling credit payment, step S860 is performed.

In step S860, send credit payment enabling information to the mobile terminal, and then step S810 is performed.

If the server detects that the mobile terminal meets the hardware condition for enabling credit payment, the server sends the credit payment enabling information to the mobile terminal. The credit payment enabling information can be a credit payment application enabling page. The user can enter user information on a credit payment application enabling interface on the mobile terminal, and upload the user information to the server.

If the server detects that the mobile terminal does not meet the hardware condition for enabling credit payment, the server does not send the credit payment enabling information to the mobile terminal.

Figure 16:
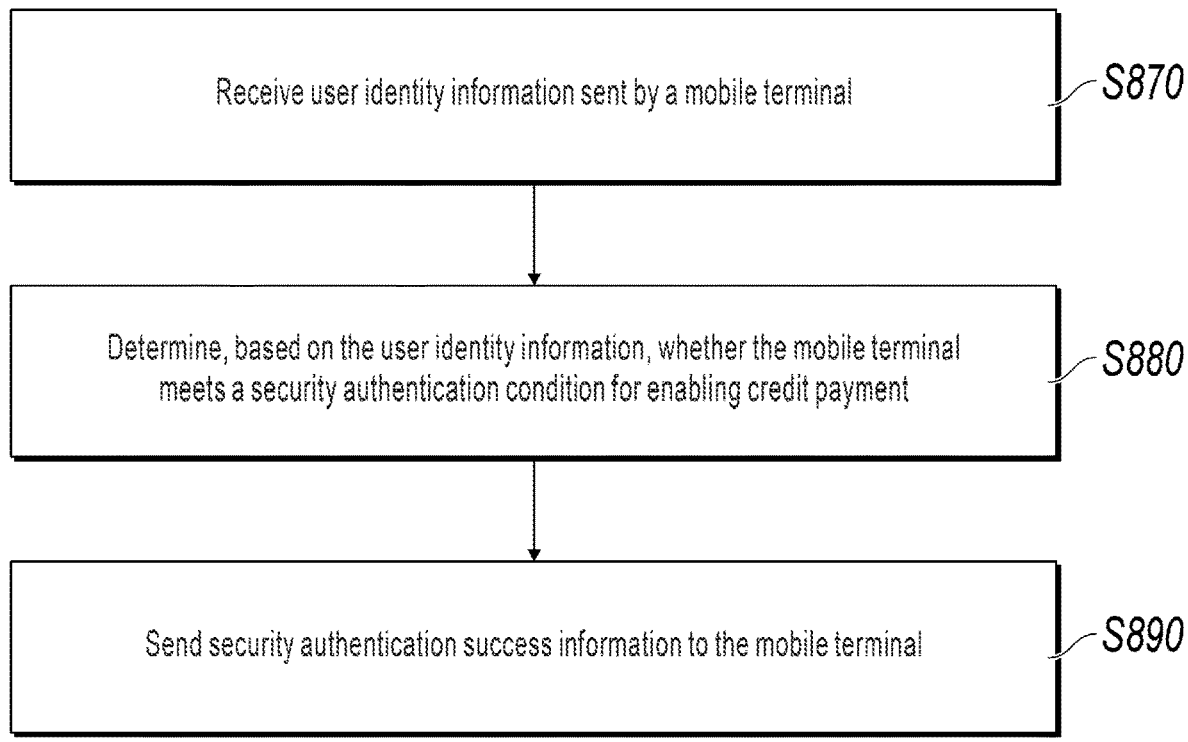
FIG. 16 is a flowchart illustrating a credit payment method based on a mobile terminal eSE, according to another example implementation.

In addition to check the device parameter information sent by the mobile terminal, the server in the credit authorization system further needs to check user identity information sent by the mobile terminal, and determine whether a user corresponding to the mobile terminal meets a security authentication condition. Therefore, based on FIG. 14, as shown in FIG. 16, in a process of enabling the credit payment function of the mobile terminal, before step S810, the credit payment method based on a mobile terminal eSE provided in the present disclosure can further include the following steps:

In step S870, receive user identity information sent by the mobile terminal.

The user identity information can be information such as an identity card number, a name, a bank card number, a mailbox, an Alipay account, etc. of the user.

In step S880, determine, based on the user identity information, whether the mobile terminal meets a security authentication condition for enabling credit payment.

For example, the server can check whether the bank card number in the user identity information provides a service normally, whether there is a bad transaction record, etc.

When the user identity information meets the security authentication condition for enabling credit payment, step S890 is performed.

In step S890, send security authentication success information to the mobile terminal, and then step S810 is performed.

If the server detects that the mobile terminal meets the security authentication condition for enabling credit payment, the server sends the security authentication success information to the mobile terminal.

Figure 17:
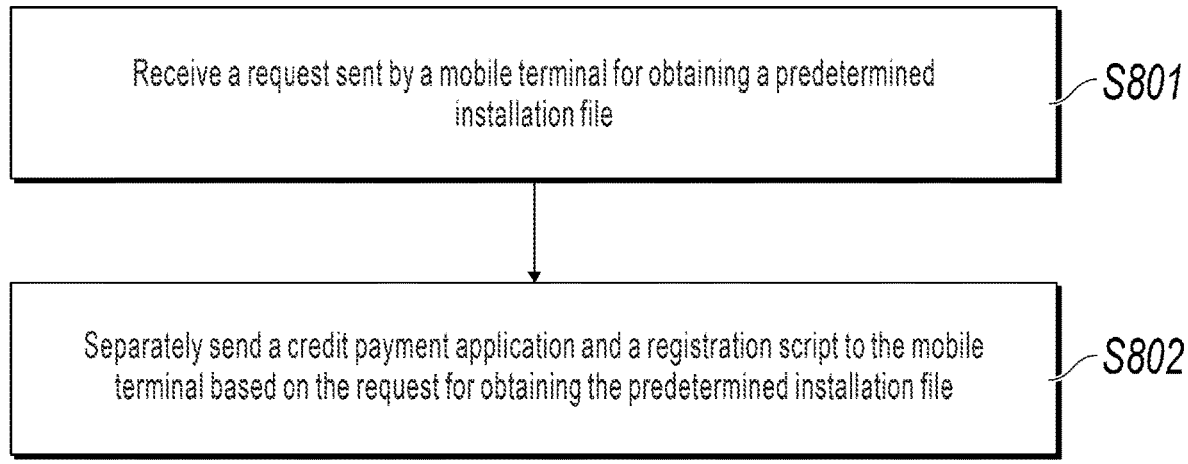
FIG. 17 is a flowchart illustrating a credit payment method based on a mobile terminal eSE, according to another example implementation.

When the mobile terminal enables credit payment, a credit payment application and a registration script further need to be installed on the mobile terminal, and these installation files need to be sent to the mobile terminal by the server in a credit payment system. Therefore, based on FIG. 14, as shown in FIG. 17, in another implementation of the present disclosure, before step S810, the credit payment method based on a mobile terminal eSE provided in the present disclosure can further include the following steps:

In step S801, receive a request sent by the mobile terminal for obtaining a predetermined installation file.

The predetermined installation file includes a credit payment application and a registration script.

In step S802, separately send the credit payment application and the registration script to the mobile terminal based on the request for obtaining the predetermined installation file, and step S810 is performed.

After obtaining the credit payment application and the registration script that are sent by the server, the mobile terminal separately installs the credit payment application and the registration script on the eSE chip.

In a process used by the mobile terminal to enable a payment transaction and a repayment transaction, an execution procedure on a mobile terminal side and an execution procedure on a transaction terminal side are separately described in detail in the previous implementations. To further describe in detail how the mobile terminal enables a payment transaction, a payment transaction process, and how to exchange data between the mobile terminal and the transaction terminal, a data exchange relationship between the mobile terminal and the transaction terminal is described below by using a signaling diagram. Certainly, the transaction terminal involved in the implementation of the present disclosure can be a server in a credit authorization system, and details are not described subsequently.

Figure 18A:
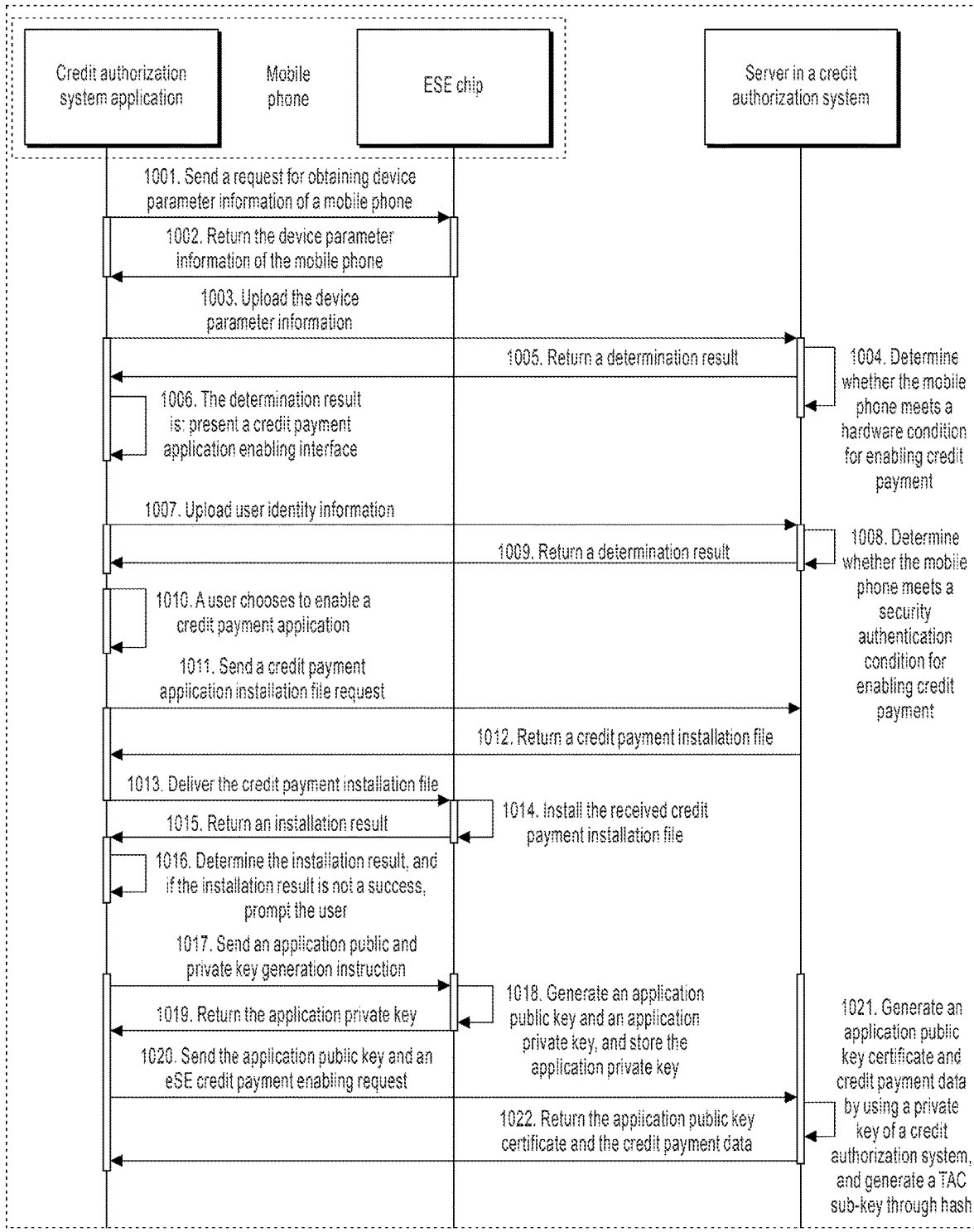
FIGS. 18A and 18B are diagrams illustrating signaling among a credit authorization system application on a mobile phone, an eSE chip, and a transaction terminal, according to an implementation of the present disclosure.
Figure 18B:
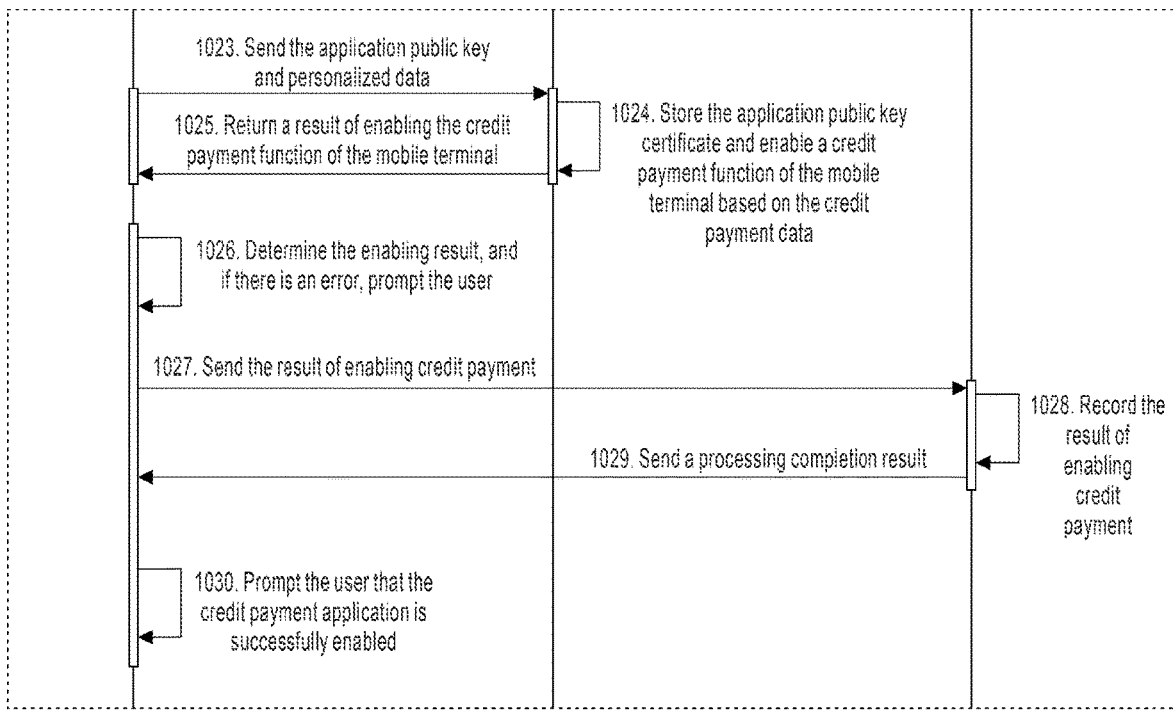

In another implementation of the present disclosure, as shown in FIGS. 18A and 18B, in an implementation of the credit payment method based on a mobile terminal eSE provided in the present disclosure, a mobile phone represents a mobile terminal, and a server in a credit authorization system represents a server, and when the mobile phone enables a credit payment function, a procedure among a credit authorization system application on the mobile terminal, an eSE chip, and a transaction terminal includes:

Step 1001: A credit authorization system application sends a request for obtaining device parameter information of a mobile phone.

Step 1002: An eSE returns the device parameter information of the mobile phone.

Step 1003: The credit authorization system application uploads the device parameter information.

Step 1004: A server in a credit authorization system determines whether the mobile phone meets a hardware condition for enabling credit payment.

Step 1005: Return a determination result.

Step 1006: The credit authorization system application determination result is: present a credit payment application enabling interface.

Step 1007: The credit authorization system application uploads user identity information.

Step 1008: The server in the credit authorization system determines whether the mobile phone meets a security authentication condition for enabling credit payment.

Step 1009: The server in the credit authorization system returns a determination result.

Step 1010: A user chooses to enable a credit payment application.

Step 1011: The credit authorization system application sends a credit payment application installation file request.

Step 1012: The server in the credit authorization system returns a credit payment installation file.

Step 1013: The credit authorization system application delivers the credit payment installation file.

Step 1014: The eSE installs the received credit payment installation file.

Step 1015: The eSE returns an installation result.

Step 1016: The credit authorization system application determines the installation result, and if the installation result is not a success, prompts the user.

Step 1017: The credit authorization system application sends an application public and private key generation instruction.

Step 1018: The eSE generates an application public key and an application private key, and stores the application private key.

Step 1019: The eSE returns the application private key.

Step 1020: The credit authorization system application sends the application public key and an eSE personalization request.

Step 1021: The server in the credit authorization system generates an application public key certificate and credit payment data by using a private key of the credit authorization system, and generates a TAC sub-key through hash.

Step 1022: The server in the credit authorization system returns the application public key certificate and the credit payment data.

Step 1023 (see FIG. 18B): The credit authorization system application sends the application public key and the credit payment data.

Step 1024: The eSE stores the application public key certificate and enables a credit payment function of the mobile terminal based on the credit payment data.

Step 1025: The eSE returns a result of enabling the credit payment function of the mobile terminal.

Step 1026: The credit authorization system application determines the result of enabling credit payment, and if there is an error, prompts the user.

Step 1027: The credit authorization system application sends the result of enabling credit payment.

Step 1028: The server in the credit authorization system records the result of enabling credit payment.

Step 1029: The server in the credit authorization system sends a processing completion result.

Step 1030: The credit authorization system application prompts the user that the credit payment application is successfully enabled.

A detailed process of mutual data exchange between the mobile terminal and the server during enabling of a payment transaction function is described in the previous implementations, and details are not described here again.

Figure 19:
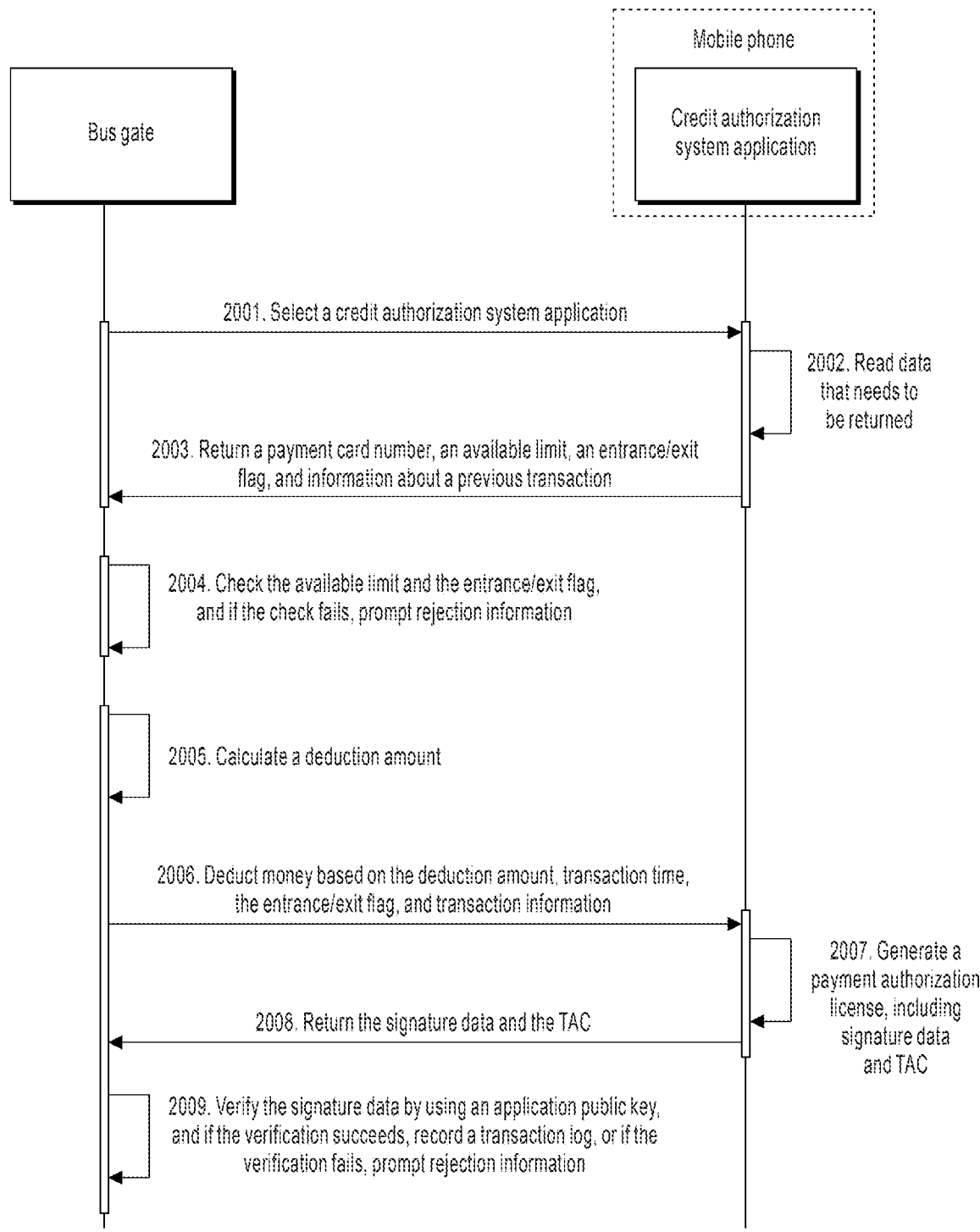
FIG. 19 is a diagram illustrating signaling between a mobile terminal and a bus gate, according to an implementation of the present disclosure.

In another implementation provided in the present disclosure, as shown in FIG. 19, in the credit payment method based on a mobile terminal eSE provided in the present disclosure, in a payment transaction process of a mobile terminal, a data exchange procedure between the mobile terminal and a bus gate is as follows:

Step 2001: The bus gate selects a credit authorization system application.

Step 2002: The credit authorization system application reads data that needs to be returned.

Step 2003: The credit authorization system application returns a payment card number, an available limit, an entrance/exit flag, and information about a previous transaction.

Step 2004: The bus gate checks the available limit and the entrance/exit flag, and if the check fails, prompts rejection information.

Step 2005: The bus gate calculates a deduction amount.

Step 2006: The bus gate deducts money based on the deduction amount, transaction time, the entrance/exit flag, and transaction information.

Step 2007: The credit authorization system application generates a payment authorization license, including signature data and TAC.

Step 2008: The credit authorization system application returns the signature data and the TAC.

Step 2009: The bus gate verifies the signature data by using an application public key, and if the verification succeeds, records a transaction log, or if the verification fails, prompts rejection information.

The previous implementations of the present disclosure are described by using credit payment for a bus as an example. The technical solutions of the present application can also be applied to other scenarios, such as subway payment and offline business payment. In different application scenarios, some procedures or some data in the previous payment can be different, and it is not limited here. There can be different implementations in specific application scenarios.

By using the descriptions of the previous method implementations, a person skilled in the art can clearly understand that the present disclosure can be implemented by using software and a necessary universal hardware platform, and can certainly be implemented by hardware, but in many cases, the former is a better implementation. Based on such an understanding, the technical solutions of the present disclosure essentially or the part contributing to the existing technology can be implemented in a form of a software product. The computer software product is stored in a storage medium, and includes several instructions for instructing a computer device (which can be a personal computer, a server, a network device, etc.) to perform all or some steps of the methods described in the implementations of the present disclosure. The storage medium includes various media that can store program code, such as a read-only memory (ROM), a random access memory (RAM), a magnetic disk, an optical disc, etc.

Figure 20:
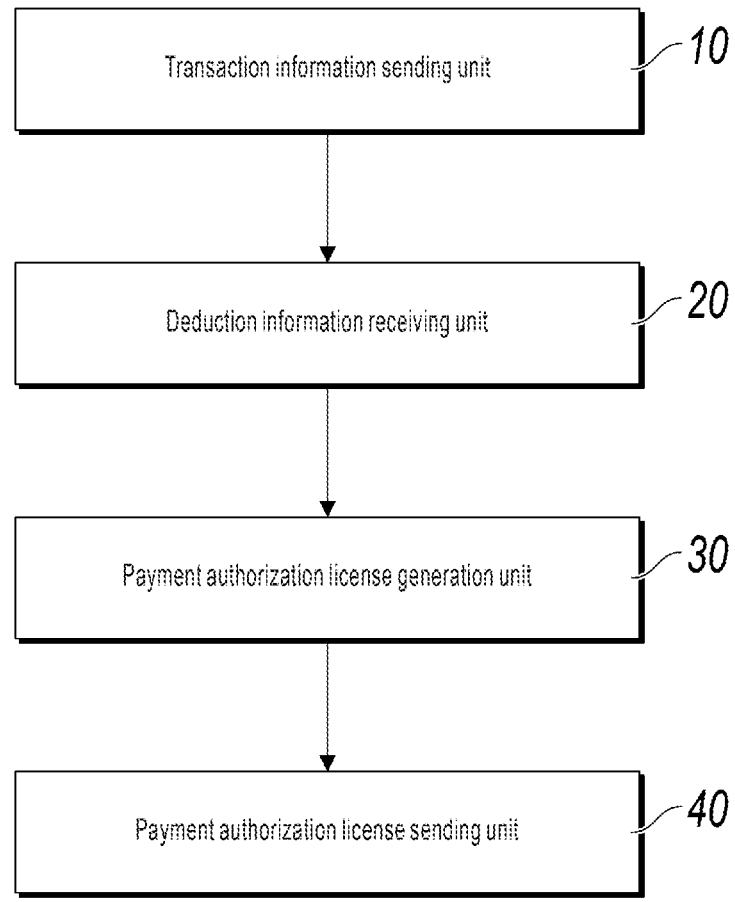
FIG. 20 is a schematic diagram illustrating a credit payment apparatus based on a mobile terminal eSE, according to an example implementation.

In addition, as an implementation of the previous implementations, an implementation of the present disclosure further provides a credit payment apparatus based on a mobile terminal eSE. The apparatus is in a mobile terminal. As shown in FIG. 20, the apparatus includes a transaction information sending unit 10, a deduction information receiving unit 20, a payment authorization license generation unit 30, and a payment authorization license sending unit 40.

The transaction information sending unit 10 is configured to send transaction information to a transaction terminal when the transaction terminal is detected.

The deduction information receiving unit 20 is configured to receive current payment transaction deduction information that is sent by the transaction terminal based on the transaction information.

The payment authorization license generation unit 30 is configured to generate a payment authorization license based on the deduction information and the transaction information by using an eSE of the mobile terminal.

The payment authorization license sending unit 40 is configured to send the payment authorization license to the transaction terminal, so that the transaction terminal completes the current payment transaction based on the received payment authorization license.

Figure 21:
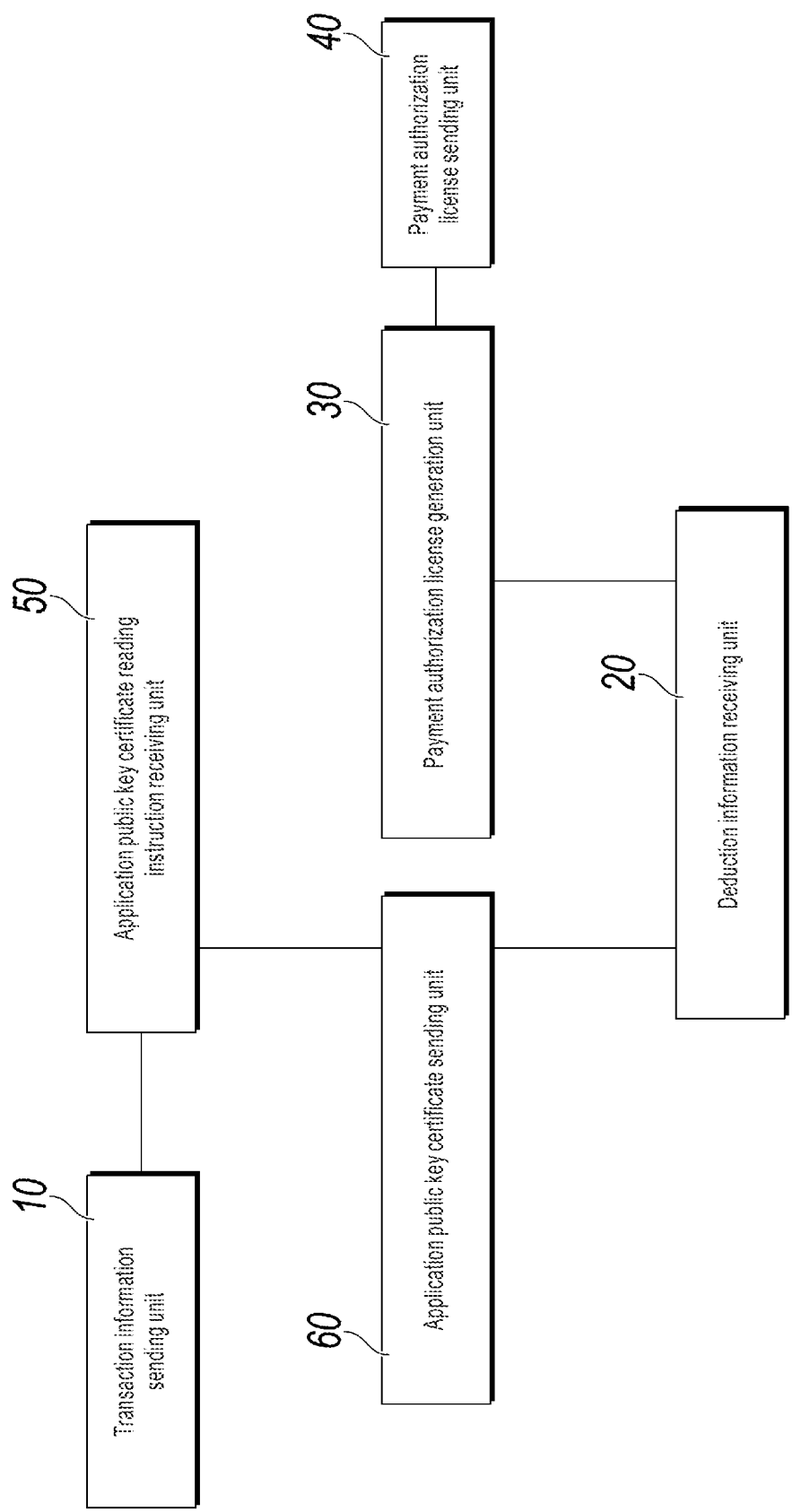
FIG. 21 is a schematic diagram illustrating a credit payment apparatus based on a mobile terminal eSE, according to an example implementation.

In another implementation of the present disclosure, based on FIG. 20, as shown in FIG. 21, the apparatus can further include: an application public key certificate reading instruction receiving unit 50, configured to receive an application public key certificate reading instruction sent by the transaction terminal; and an application public key certificate sending unit 60, configured to send an application public key certificate to the transaction terminal based on the application public key certificate reading instruction.

Figure 22:
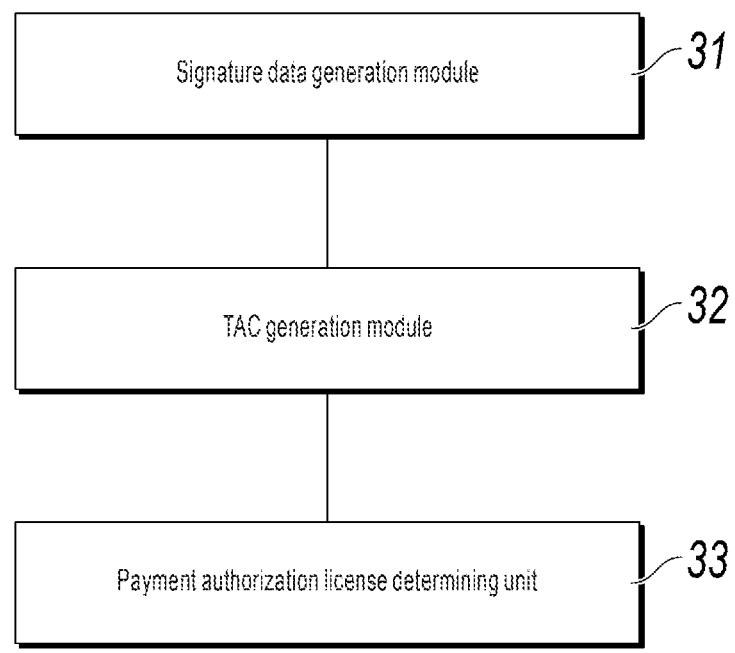
FIG. 22 is a schematic diagram illustrating a payment authorization license generation unit in FIG. 20.

In another implementation of the present disclosure, based on FIG. 20, as shown in FIG. 22, the payment authorization license generation unit 30 includes: a signature data generation module 31, a TAC generation module 32, and a payment authorization license determining module 33.

The signature data generation module 31 is configured to generate signature data based on the deduction information by using an application private key stored on the eSE.

The TAC generation module 32 is configured to generate a TAC based on the deduction information and the transaction information by using a TAC sub-key that is pregenerated on the eSE.

The payment authorization license determining module 33 is configured to use the signature data and the TAC as a payment authorization license.

Figure 23:
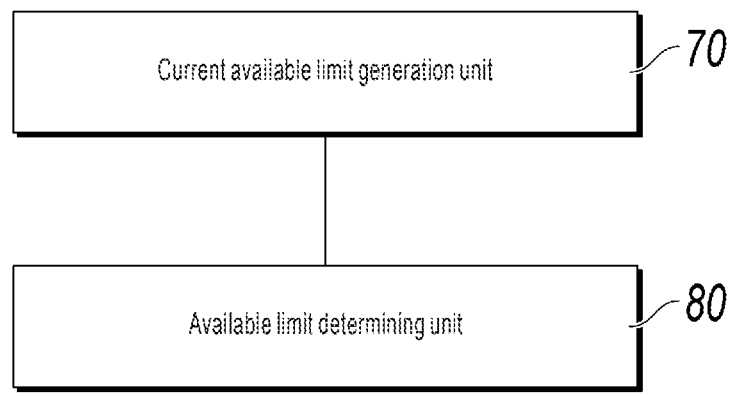
FIG. 23 is a schematic diagram illustrating a credit payment apparatus based on a mobile terminal eSE, according to an example implementation.

In another implementation of the present disclosure, based on FIG. 20, as shown in FIG. 23, the apparatus further includes a current available limit generation unit 70 and an available limit determining unit 80.

The current available limit generation unit 70 is configured to subtract a deduction amount from an available limit in the transaction information based on the deduction amount in the current payment transaction deduction information, to obtain a current available limit.

The available limit determining unit 80 is configured to use the current available limit as an available limit corresponding to a user in the mobile terminal.

Figure 24:
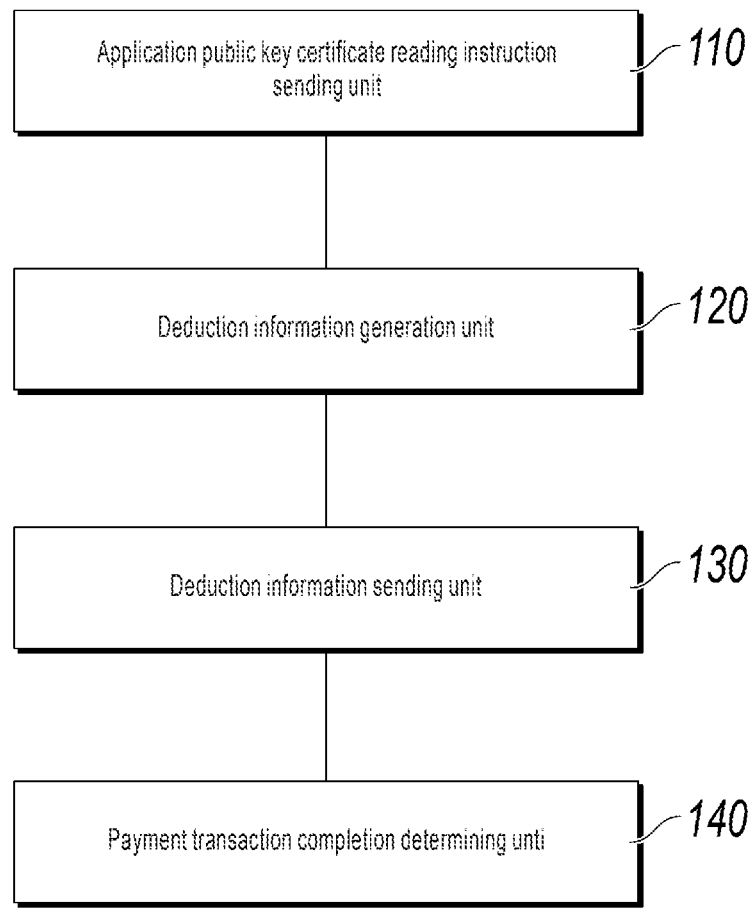
FIG. 24 is a schematic diagram illustrating a credit payment apparatus based on a mobile terminal eSE, according to another example implementation.

An implementation of the present disclosure further provides a credit payment apparatus based on a mobile terminal eSE. The apparatus is in a transaction terminal. As shown in FIG. 24, the apparatus includes an application public key certificate reading instruction sending unit 110, a deduction information generation unit 120, a deduction information sending unit 130, and a payment transaction completion determining unit 140.

The application public key certificate reading instruction sending unit 110 is configured to receive transaction information sent by a mobile terminal.

The deduction information generation unit 120 is configured to generate current payment transaction deduction information based on the transaction information.

The deduction information sending unit 130 is configured to send the deduction information to the mobile terminal.

The payment transaction completion determining unit 140 is configured to: when a payment authorization license is received, determine, based on the payment authorization license, that the current payment transaction is completed.

Figure 25:
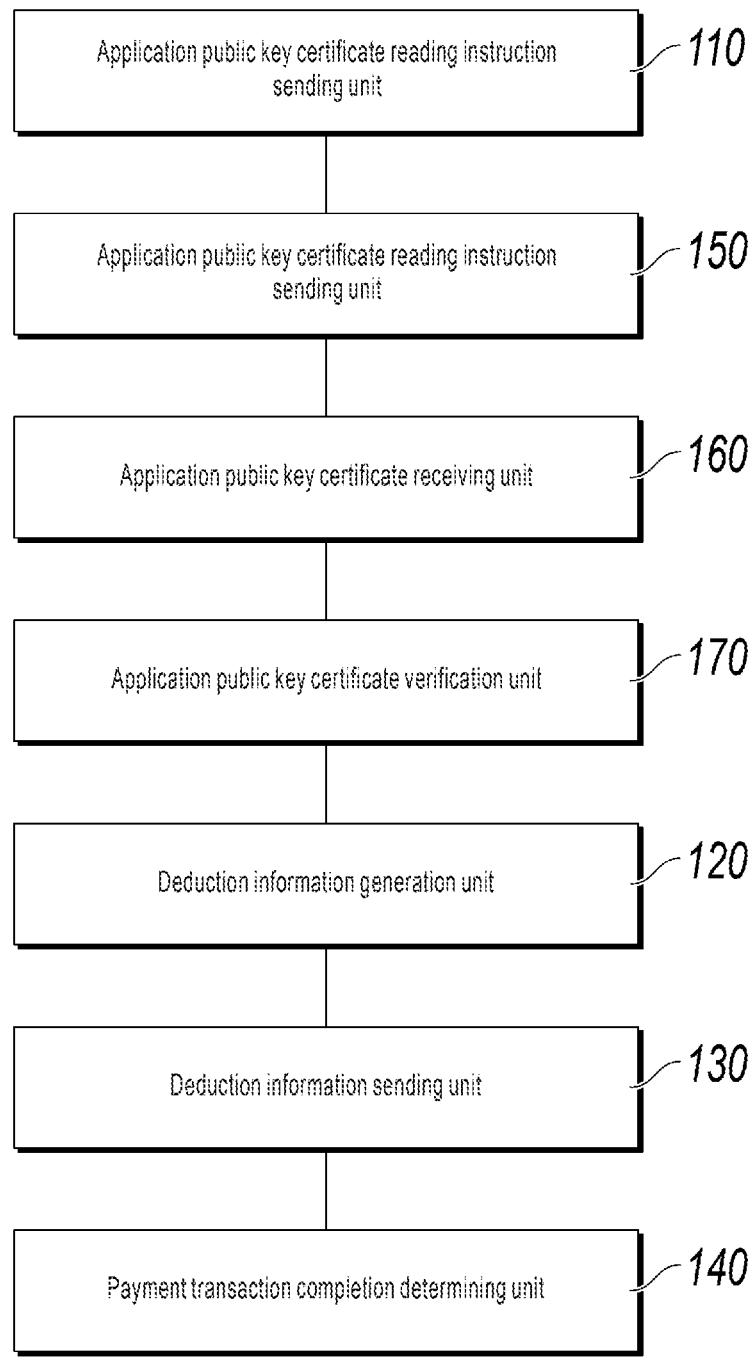
FIG. 25 is a schematic diagram illustrating a credit payment apparatus based on a mobile terminal eSE, according to another example implementation.

In another implementation of the present disclosure, based on FIG. 23, as shown in FIG. 25, the apparatus further includes: an application public key certificate reading instruction sending unit 150, configured to send an application public key certificate reading instruction to the mobile terminal; an application public key certificate receiving unit 160, configured to receive an application public key certificate sent by the predetermined mobile terminal; and an application public key certificate verification unit 170, configured to verify the application public key certificate by using a credit authorization public key locally stored on the transaction terminal.

Figure 26:
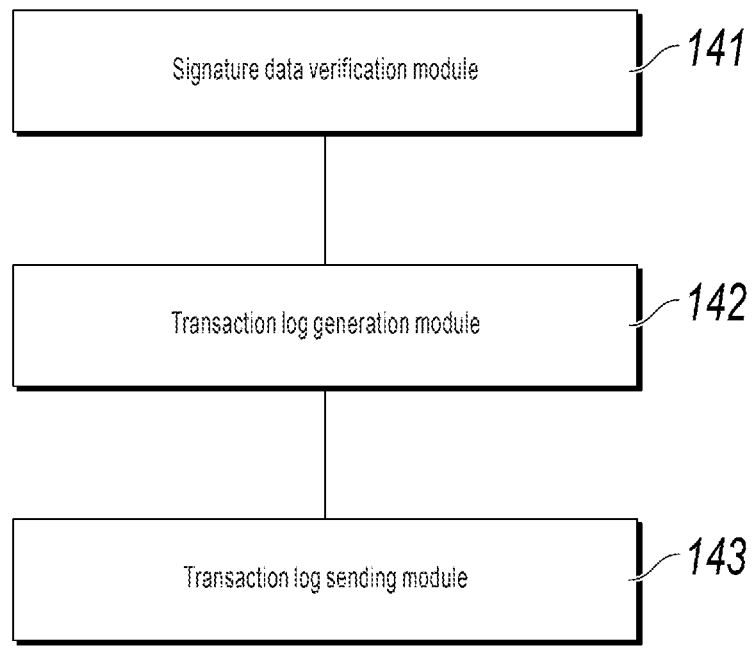
FIG. 26 is a schematic diagram illustrating a payment transaction completion determining unit in FIG. 24.

In another implementation of the present disclosure, based on FIG. 23, as shown in FIG. 26, the payment authorization license includes signature data and a TAC. The payment transaction completion determining unit 140 includes a signature data verification module 141, a transaction log generation module 142, and a transaction log sending module 143.

The signature data verification module 141 is configured to verify the signature data by using the application public key.

The transaction log generation module 142 is configured to generate a transaction log when the signature data is verified.

The transaction log sending module 143 is configured to send the transaction log to a predetermined server, so that the predetermined server deducts a corresponding amount of money from a user account corresponding to the mobile terminal based on the transaction log. The transaction log includes: a deduction amount, a transaction date, a transaction time, a transaction terminal ID, a payment card number, an available limit, and a TAC.

Figure 27:
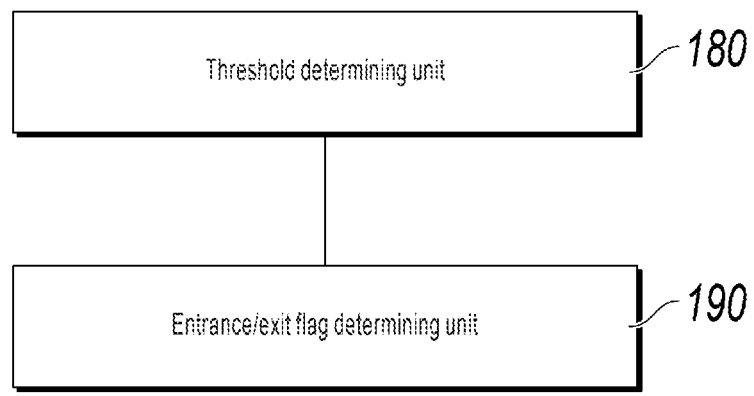
FIG. 27 is a schematic diagram illustrating a credit payment apparatus based on a mobile terminal eSE, according to another example implementation.

In another implementation of the present disclosure, based on FIG. 23, as shown in FIG. 27, the apparatus is applied to payment for bus traveling, the transaction information includes at least an available limit and an entrance/exit flag, and the apparatus further includes a threshold determining unit 180 and an entrance/exit flag determining unit 190.

The threshold determining unit 180 is configured to determine whether the available limit in the transaction information is greater than or equal to a predetermined threshold.

The entrance/exit flag determining unit 190 is configured to: when the available limit is greater than or equal to the predetermined threshold, check whether the entrance/exit flag in the transaction information is in an exited state.

The application public key certificate reading instruction sending unit 110 is further configured to send the application public key certificate reading instruction to the mobile terminal when the entrance/exit flag in the transaction information is in an exited state.

Figure 28:
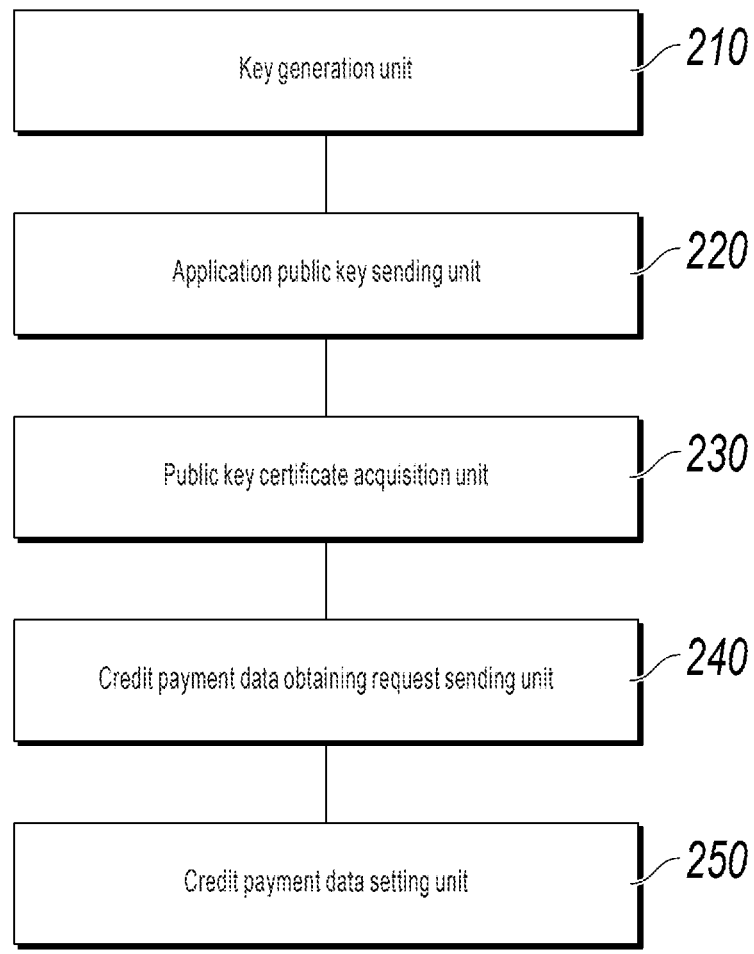
FIG. 28 is a schematic diagram illustrating a credit payment apparatus based on a mobile terminal eSE, according to another example implementation.

An implementation of the present disclosure further provides a credit payment apparatus based on a mobile terminal eSE. The apparatus is in a mobile terminal. As shown in FIG. 28, the apparatus includes a key generation unit 210, an application public key sending unit 220, a public key certificate acquisition unit 230, a credit payment data obtaining request sending unit 240, and a credit payment data setting unit 250.

The key generation unit 210 is configured to separately generate an application public key and an application private key by using an eSE of the mobile terminal.

The application public key sending unit 220 is configured to send the application public key to a predetermined server, so that the predetermined server signs the application public key by using a locally stored authorization private key, to generate an application public key certificate.

The public key certificate acquisition unit 230 is configured to obtain a public key certificate sent by the predetermined server, and save both the application public key certificate and the application private key on the eSE.

The credit payment data obtaining request sending unit 240 is configured to send a credit payment data obtaining request to the predetermined server.

The credit payment data setting unit 250 is configured to receive credit payment data sent by the predetermined server, and enable a credit payment function of the mobile terminal based on the credit payment data.

Figure 29:
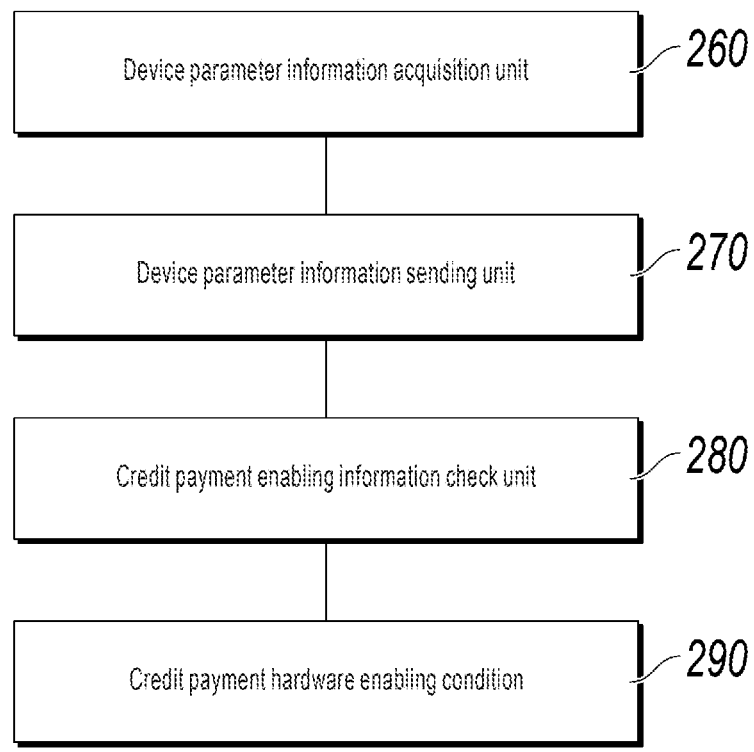
FIG. 29 is a schematic diagram illustrating a credit payment apparatus based on a mobile terminal eSE, according to another example implementation.

In another implementation of the present disclosure, based on FIG. 27, as shown in FIG. 29, the apparatus further includes a device parameter information acquisition unit 260, a device parameter information sending unit 270, a credit payment enabling information check unit 280, and a credit payment hardware enabling condition 290.

The device parameter information acquisition unit 260 is configured to obtain device parameter information of the mobile terminal.

The device parameter information sending unit 270 is configured to send the device parameter information to the predetermined server, so that the predetermined server determines, based on the received device parameter information, whether the mobile terminal meets a hardware condition for enabling credit payment.

The credit payment enabling information check unit 280 is configured to determine whether credit payment enabling information sent by the predetermined server is received.

The credit payment hardware enabling condition 290 is used to determine, when the credit payment enabling information sent by the predetermined server is received, that the mobile terminal meets the hardware condition for enabling credit payment.

Figure 30:
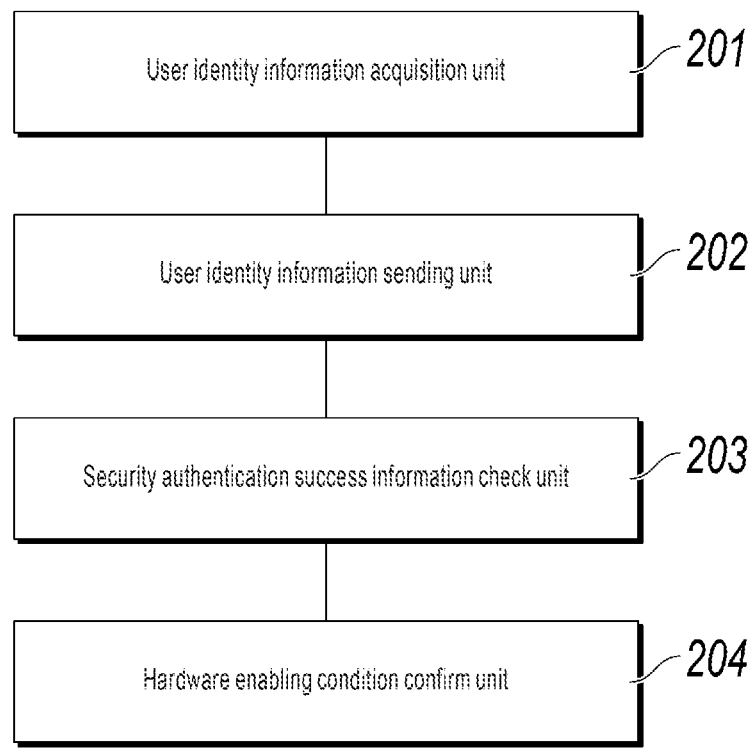
FIG. 30 is a schematic diagram illustrating a credit payment apparatus based on a mobile terminal eSE, according to another example implementation.

In another implementation of the present disclosure, based on FIG. 27, as shown in FIG. 30, the apparatus further includes a user identity information acquisition unit 201, a user identity information sending unit 202, a security authentication success information check unit 203, and a hardware enabling condition confirm unit 204.

The user identity information acquisition unit 201 is configured to obtain user identity information.

The user identity information sending unit 202 is configured to send the user identity information to the predetermined server, so that the predetermined server determines, based on the received user identity information, whether the mobile terminal meets a security authentication condition for enabling credit payment.

The security authentication success information check unit 203 is configured to check whether security authentication success information sent by the predetermined server is received.

The hardware enabling condition confirm unit 204 is configured to determine, when the security authentication success information sent by the predetermined server is received, that the mobile terminal meets the security authentication condition for enabling credit payment.

Figure 31:
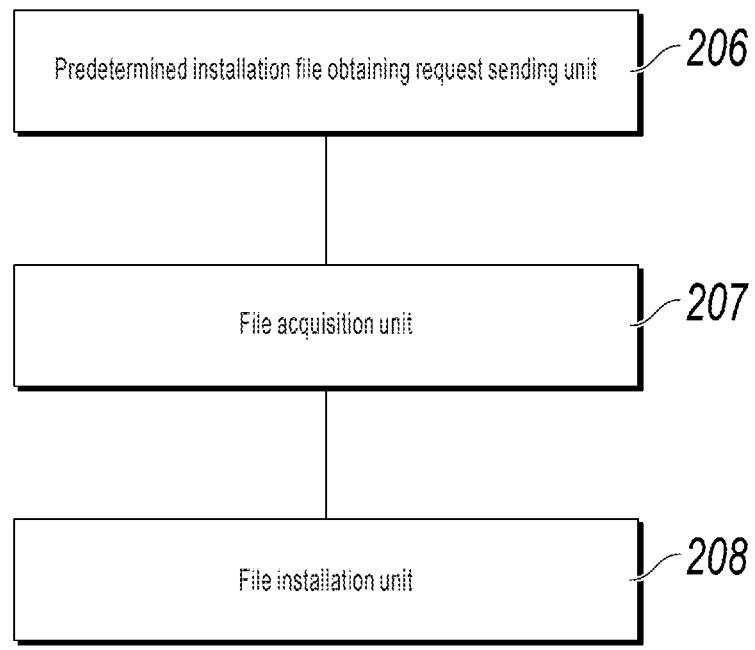
FIG. 31 is a schematic diagram illustrating a credit payment apparatus based on a mobile terminal eSE, according to another example implementation.

In another implementation of the present disclosure, based on FIG. 27, as shown in FIG. 31, the apparatus further includes a predetermined installation file obtaining request sending unit 206, a file acquisition unit 207, and a file installation unit 208.

The predetermined installation file obtaining request sending unit 206 is configured to send a request for obtaining a predetermined installation file to the predetermined server.

The predetermined installation file includes a credit payment application and a registration script.

The file acquisition unit 207 is configured to obtain the credit payment application and the registration script that are sent by the predetermined server.

The file installation unit 208 is configured to separately install the credit payment application and the registration script on the eSE.

Figure 32:
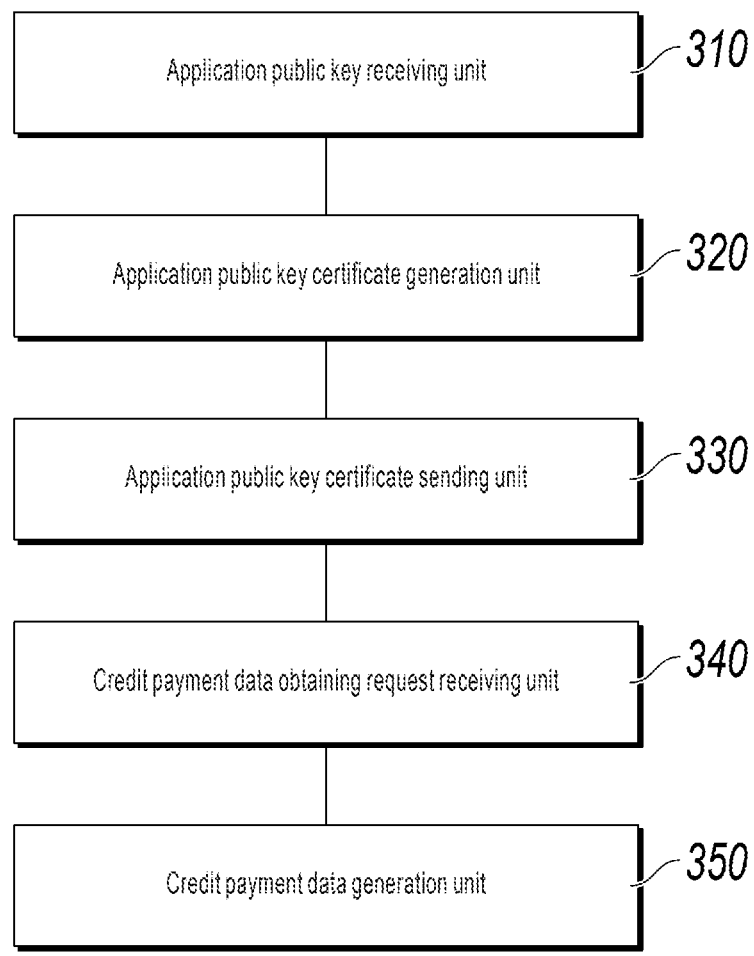
FIG. 32 is a schematic diagram illustrating a credit payment apparatus based on a mobile terminal eSE, according to another example implementation.

An implementation of the present disclosure further provides a credit payment apparatus based on a mobile terminal eSE. The apparatus is in a server. As shown in FIG. 32, the apparatus includes an application public key receiving unit 310, an application public key certificate generation unit 320, an application public key certificate sending unit 330, a credit payment data obtaining request receiving unit 340, and a credit payment data generation unit 350.

The application public key receiving unit 310 is configured to receive an application public key sent by a mobile terminal.

The application public key certificate generation unit 320 is configured to sign the application public key by using an authorization private key locally stored on the server, to generate an application public key certificate.

The application public key certificate sending unit 330 is configured to send the application public key certificate to the mobile terminal, so that the mobile terminal saves the received application public key certificate on an eSE.

The credit payment data obtaining request receiving unit 340 is configured to receive a credit payment data obtaining request sent by the mobile terminal.

The credit payment data generation unit 350 is configured to generate credit payment data corresponding to the mobile terminal based on the credit payment data obtaining request, and send the credit payment data to the mobile terminal, so that the mobile terminal enables a credit payment function of the mobile terminal based on the received credit payment data.

Figure 33:
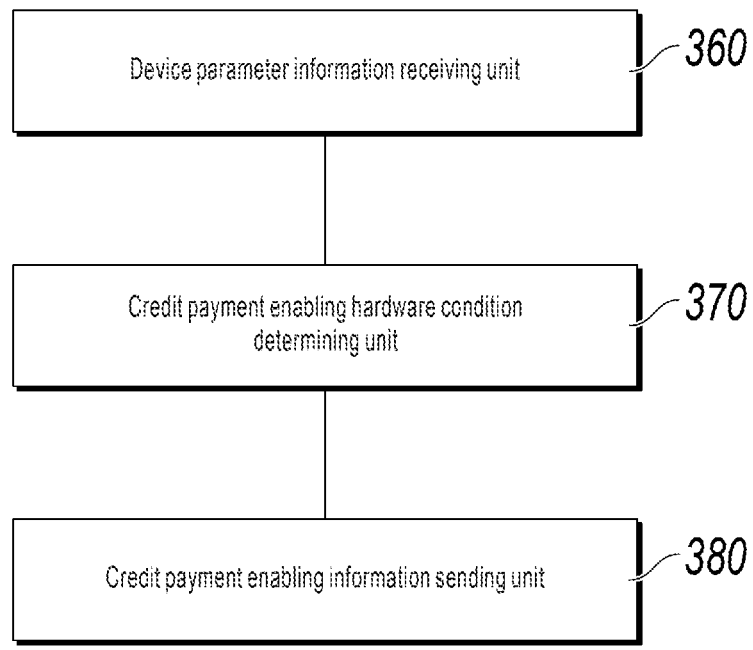
FIG. 33 is a schematic diagram illustrating a credit payment apparatus based on a mobile terminal eSE, according to another example implementation.

In another implementation of the present disclosure, based on FIG. 31, as shown in FIG. 33, the apparatus further includes a device parameter information receiving unit 360, a credit payment enabling hardware condition determining unit 370, and a credit payment enabling information sending unit 380.

The device parameter information receiving unit 360 is configured to receive device parameter information sent by the mobile terminal.

The credit payment enabling hardware condition determining unit 370 is configured to determine, based on the device parameter information, whether the mobile terminal meets a hardware condition for enabling credit payment.

The credit payment enabling information sending unit 380 is configured to send credit payment enabling information to the mobile terminal when the mobile terminal meets the hardware condition for enabling credit payment.

Figure 34:
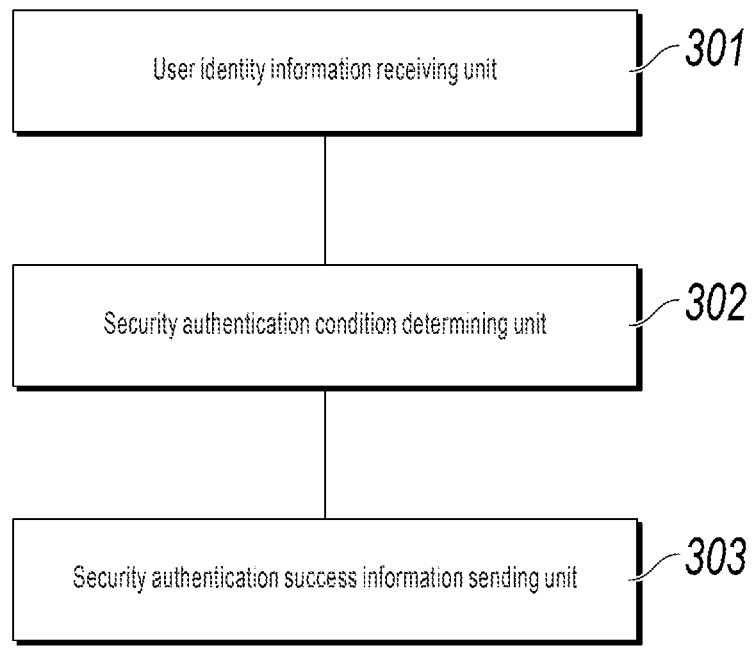
FIG. 34 is a schematic diagram illustrating a credit payment apparatus based on a mobile terminal eSE, according to another example implementation.

In another implementation of the present disclosure, based on FIG. 31, as shown in FIG. 34, the apparatus further includes a user identity information receiving unit 301, a security authentication condition determining unit 302, and a security authentication success information sending unit 303.

The user identity information receiving unit 301 is configured to receive user identity information sent by the mobile terminal.

The security authentication condition determining unit 302 is configured to determine, based on the user identity information, whether the mobile terminal meets a security authentication condition for enabling credit payment.

The security authentication success information sending unit 303 is configured to send security authentication success information to the mobile terminal when the user identity information meets the security authentication condition for enabling credit payment.

Figure 35:
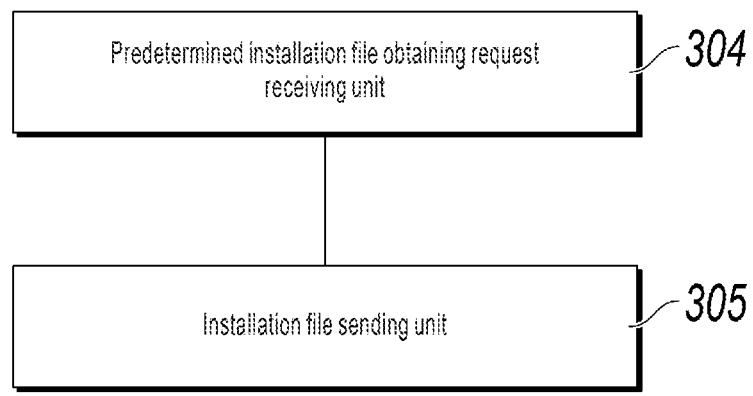
FIG. 35 is a schematic diagram illustrating a credit payment apparatus based on a mobile terminal eSE, according to another example implementation.

In another implementation of the present disclosure, based on FIG. 31, as shown in FIG. 35, the apparatus further includes a predetermined installation file obtaining request receiving unit 304 and an installation file sending unit 305.

The predetermined installation file obtaining request receiving unit 304 is configured to receive a request sent by the mobile terminal for obtaining a predetermined installation file, and the predetermined installation file includes a credit payment application and a registration script.

The installation file sending unit 305 is configured to separately send the credit payment application and the registration script to the mobile terminal based on the request for obtaining the predetermined installation file.

With regard to the apparatus in the above embodiments, the specific manner in which each module performs an operation has been described in detail in the embodiment related to the method, and details are not described here.

It can be understood that the present disclosure can be applied to many general-purpose or special purpose computing system environments or configurations, for example, a personal computer, a server computer, a handheld device or a portable device, a tablet device, a multi-processor system, a microprocessor-based system, a set top box, a programmable consumer electronic device, a network PC, a minicomputer, a mainframe computer, and a distributed computing environment including any one of the earlier described systems or devices.

The present disclosure can be described in the general context of an executable computer instruction executed by a computer, for example, a program module. Generally, the program module includes a routine, a program, an object, a component, a data structure, etc. for executing a particular task or implementing a particular abstract data type. The present disclosure can also be practiced in distributed computing environments. In the distributed computing environments, tasks are executed by remote processing devices that are connected through a communications network. In a distributed computing environment, the program module can be located in both local and remote computer storage media including storage devices.

Notably, in the present specification, relational terms such as "first", "second", etc. are merely used to distinguish one entity or operation from another entity or operation, and do not necessarily require or imply that there is any such actual relationship or sequence between these entities or operations. Moreover, the terms "include", "comprise", or their any other variant are intended to cover a non-exclusive inclusion, so that a process, a method, a product, or a device that includes a list of elements not only includes those elements but also includes other elements that are not expressly listed, or further includes elements inherent to such a process, method, product, or device. An element described by "includes a . . . " further includes, without more constraints, another identical element in the process, method, commodity, or device that includes the element.

A person skilled in the art can easily figure out another implementation solution of the present disclosure after considering the specification and practicing the present disclosure here. The present application is intended to cover any variations, functions, or adaptive changes of the present disclosure. These variations, functions, or adaptive changes comply with general principles of the present disclosure and include common knowledge or a commonly used technical means in the technical field that is not disclosed in the present disclosure. The specification and the implementations are merely considered as examples, and the actual scope and the spirit of the present disclosure are pointed out by the appended claims.

It should be understood that the present disclosure is not limited to the accurate structures that are described above and that are shown in the accompanying drawings, and modifications and changes can be made without departing from the scope of the present disclosure. The scope of the present disclosure is limited only by the appended claims.

Figure 36:
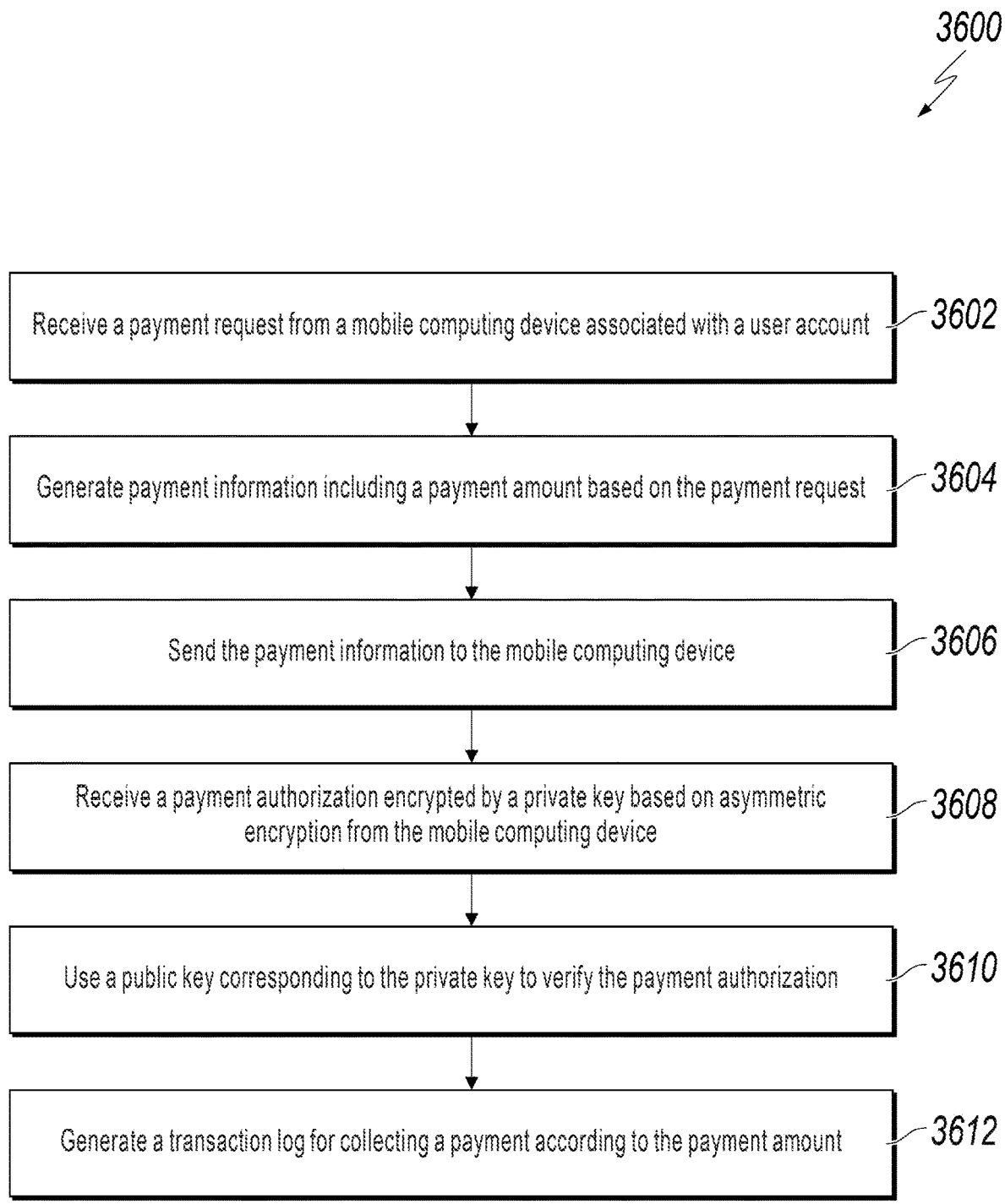
FIG. 36 is a flowchart illustrating an example of a method for collecting mobile credit payment using a payment collection device, according to an implementation of the present disclosure.

FIG. 36 is a flowchart illustrating an example of a method 3600 for collecting mobile credit payment using a payment collection device, according to an implementation of the present disclosure. For clarity of presentation, the description that follows generally describes method 3600 in the context of the other figures in this description. However, it will be understood that method 3600 can be performed, for example, by any system, environment, software, and hardware, or a combination of systems, environments, software, and hardware, as appropriate. In some implementations, various steps of method 3600 can be run in parallel, in combination, in loops, or in any order.

At 3602, a payment request is received from a mobile computing device associated with a user account. For ease of illustration, a gate scanner device at a public transportation station is used as an example of a payment collection device. A commuter can perform mobile credit payment for public transportation at the gate of a station using the gate scanner device. In some implementations, the gate scanner device can be an optical scanner that can scan a two-dimensional (2D) code or can register a mobile credit payment using NFC, RFID, or other wireless communication technologies. In some implementations, the 2D code can be a quick response (QR) code or a barcode. In some cases, a payment Applet or an application can be installed on an eSE of the mobile computing device. In some cases, the application can also communicate with a remote payment server to perform payment authorization. The payment application or the payment authorization application can be associated with a payment account of a user. The gate scanner device can parse the payment request to identify payment account information included in the payment request. In some cases, the payment request can include various payment account information, such as a payment account ID (for example, account ID, payment card number, or bank account number), available balance of the payment account, a service entrance registration, or a service exit registration. The service entrance and existing registration can include date, time, place, or station name that a user's mobile computing device registers at the gate scanner device (for example, when entering or exiting a bus or metro gate). In some cases, the gate scanner device can determine whether the payment account information can provide service qualification. For example, an available balance can be determined and compared to the public transportation fare. If the available balance is not enough to cover a public transportation fare, a gate entrance or exit can be denied.

In some cases, a gate scanner device can send a public key certificate request to the mobile computing device to retrieve a public key certificate after receiving the payment request. The public key certificate request can be used to retrieve a public key certificate pre-generated and stored on the eSE of the mobile computing device. After receiving the public key certificate from the mobile computing device, the gate scanner device can use a credit authorization public key to verify the public key certificate. If the verification fails, the gate scanner device can deny the payment request. Otherwise, the gate scanner device can retrieve a public key from the public key certificate before generating the payment information. From 3602, method 3600 proceeds to 3604.

At 3604, payment information, including a payment amount, is generated based on the payment request. The payment information can include a payment amount and at least one of a date and time of the payment request, a service entrance registration, a service exit registration, or station information associated with the payment request. From 3604, method 3600 proceeds to 3606.

At 3606, the payment information is sent to the mobile computing device. After receiving the payment information, the mobile computing device can generate a digital signature based on the payment information by using a private key stored in the eSE. The private key can be pre-generated and stored on the eSE of the mobile computing device. The payment application can digitally sign the payment information by using the private key to generate the digital signature. In some cases, the mobile computing device can also generate a TAC based on the payment information and the payment request by using a TAC sub-key that is pre-generated and stored in the eSE. The digital signature and the TAC can be used as the payment authorization. The digital signature and the TAC can be sent to the gate scanner device separately or together. The TAC sub-key can be obtained by a remote server of a credit authorization system based on a card number hash using a TAC parent private key. From 3606, method 3600 proceeds to 3608.

At 3608, a payment authorization encrypted by a private key based on asymmetric encryption is received from the mobile computing device. From 3608, method 3600 proceeds to 3610.

At 3610, a public key corresponding to the private key is used to verify the payment authorization. In some cases, the gate scanner device can verify the digital signature included in the payment authorization using the public key retrieved from the public key certificate. If the verification is successful, a translation log for collecting the payment according to the payment account can be generated. Otherwise, the payment request can be denied. From 3610, method 3600 proceeds to 3612.

At 3612, if the payment authorization is verified, a transaction log for collecting a payment according to the payment amount is generated. The transaction log can include a payment amount, a payment log generation time, a payment collection device ID, a payment card number, an available balance, or a TAC. In some cases, the gate scanner device can send the transaction log to a server to deduct the payment amount from the available balance of the user account based on the transaction log. After 3612, method 3600 stops.

Implementations of the subject matter described in this specification can be implemented so as to realize particular advantages or technical effects. For example, implementations of the subject matter permit a public transportation payment collection device to securely accept payment offline. The payment collection device receives a payment request, requesting a public key certificate from the mobile computing device to retrieve a public key, and use the retrieved public key to verify a payment authorization encrypted by the mobile computing device. A transaction can be recorded if the payment authorization is successfully verified. The transaction log can be sent to a credit payment authorization server to execute the payment. Since the transaction log can be recorded offline, the payment collection or registration device at the public transportation station only need to connect to the credit payment authorization server periodically to execute a plurality of payments together. As such, mobile payments of public transportation can be more efficiently and securely performed.

The described methodology permits enhancement of transaction/data security of various mobile computing device and payment collection device. Participants in transactions using eSE embedded in mobile computing devices and payment collection device such as a public transportation gate scanner can be confident that short-range communications such as NFC and security measures including asymmetric key encryption can ensure secured offline credit payment.

Asymmetric key encryption can be used to enhance data security. A public key is stored in the eSE of mobile computing devices instead of public transportation payment collection device and can be retrieved only by request. A private key can be used to provide digital signature to payment information and generate TAC to further enhance payment security.

The described methodology can ensure the efficient usage of computer resources (for example, processing cycles, network bandwidth, and memory usage), through the efficient offline payment processing. At least these actions can minimize or prevent waste of available computer and network resources with respect to multiple parties in mobile transactions by reducing bandwidth occupancy between the payment collection device, the mobile computing device, and the server. Instead of the payment collection device needing to verify data with additional communication or transactions with the server in real-time, transactions can be depended upon as valid when the payment collection device is offline to avoid delays cost by network delays. The payment can be more quickly and securely recorded to improve user experience.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
receiving, using near field communication (NFC), an offline payment request from a mobile computing device associated with a user account, wherein the offline payment request is for purchasing a product or service by a user, and wherein a public key certificate and a private key are stored on the mobile computing device;
sending, using the NFC, a public key certificate request to the mobile computing device to retrieve the public key certificate;
receiving, using the NFC, the public key certificate from the mobile computing device;
using a locally stored credit authorization public key to retrieve a public key corresponding to the private key from the public key certificate;
generating payment information including a payment amount based on the offline payment request;
sending, using the NFC, the payment information to the mobile computing device;
receiving, using the NFC, a payment authorization encrypted by the private key based on asymmetric encryption from the mobile computing device;
using the public key corresponding to the private key to verify the payment authorization; and
in response to successfully verifying the payment authorization:
providing the product or service to the user; and
generating an offline transaction log for collecting a payment from the user account according to the payment amount, wherein the offline transaction log includes the payment amount, a payment log generation time, a payment collection device ID, a payment card number, an available balance, and a transaction authentication code (TAC).

2. The computer-implemented method of claim 1, wherein the payment authorization includes the payment information encrypted by the private key and the TAC.

3. The computer-implemented method of claim 2, wherein the private key is stored in an embedded secure element (eSE) of the mobile computing device and the TAC is generated based on the payment information and the offline payment request by using a TAC sub-key that is pre-generated and stored on the eSE.

4. The computer-implemented method of claim 1, further comprising sending the offline transaction log to a server to deduct the payment amount from the available balance of the user account based on the offline transaction log.

5. The computer-implemented method of claim 1, wherein the offline payment request includes at least one of a payment account identifier, available balance of the payment account, a service entrance registration, or a service exit registration.

6. The computer-implemented method of claim 1, wherein the payment information includes the payment amount and at least one of a date and time of the offline payment request, a service entrance registration, a service exit registration, or station information associated with the offline payment request.

7. A non-transitory, computer-readable medium storing one or more instructions executable by a computer system to perform operations comprising:
receiving, using near field communication (NFC), an offline payment request from a mobile computing device associated with a user account, wherein the offline payment request is for purchasing a product or service by a user, and wherein a public key certificate and a private key are stored on the mobile computing device;
sending, using the NFC, a public key certificate request to the mobile computing device to retrieve the public key certificate;
receiving, using the NFC, the public key certificate from the mobile computing device;
using a locally stored credit authorization public key to retrieve a public key corresponding to the private key from the public key certificate;
generating payment information including a payment amount based on the offline payment request;
sending, using the NFC, the payment information to the mobile computing device;
receiving, using the NFC, a payment authorization encrypted by the private key based on asymmetric encryption from the mobile computing device;
using the public key corresponding to the private key to verify the payment authorization; and
in response to successfully verifying the payment authorization:
providing the product or service to the user; and
generating an offline transaction log for collecting a payment from the user account according to the payment amount, wherein the offline transaction log includes the payment amount, a payment log generation time, a payment collection device ID, a payment card number, an available balance, and a transaction authentication code (TAC).

8. The non-transitory, computer-readable medium of claim 7, wherein the payment authorization includes the payment information encrypted by the private key and the TAC.

9. The non-transitory, computer-readable medium of claim 8, wherein the private key is stored in an embedded secure element (eSE) of the mobile computing device and the TAC is generated based on the payment information and the offline payment request by using a TAC sub-key that is pre-generated and stored on the eSE.

10. The non-transitory, computer-readable medium of claim 7, further comprising one or more instructions to send the offline transaction log to a server to deduct the payment amount from the available balance of the user account based on the offline transaction log.

11. The non-transitory, computer-readable medium of claim 7, wherein the offline payment request includes at least one of a payment account identifier, available balance of the payment account, a service entrance registration, or a service exit registration.

12. The non-transitory, computer-readable medium of claim 7, wherein the payment information includes the payment amount and at least one of a date and time of the offline payment request, a service entrance registration, a service exit registration, or station information associated with the offline payment request.

13. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
- receiving, using near field communication (NFC), an offline payment request from a mobile computing device associated with a user account, wherein the offline payment request is for purchasing a product or service by a user, and wherein a public key certificate and a private key are stored on the mobile computing device;
- sending, using the NFC, a public key certificate request to the mobile computing device to retrieve the public key certificate;
- receiving, using the NFC, the public key certificate from the mobile computing device;
- using a locally stored credit authorization public key to retrieve a public key corresponding to the private key from the public key certificate;
- generating payment information including a payment amount based on the offline payment request;
- sending, using the NFC, the payment information to the mobile computing device;
- receiving, using the NFC, a payment authorization encrypted by the private key based on asymmetric encryption from the mobile computing device;
- using the public key corresponding to the private key to verify the payment authorization; and
- in response to successfully verifying the payment authorization:
  - providing the product or service to the user; and
  - generating an offline transaction log for collecting a payment from the user account according to the payment amount, wherein the offline transaction log includes the payment amount, a payment log generation time, a payment collection device ID, a payment card number, an available balance, and a transaction authentication code (TAC).

14. The computer-implemented system of claim 13, wherein the payment authorization includes the payment information encrypted by the private key and the TAC.

15. The computer-implemented system of claim 14, wherein the private key is stored in an embedded secure element (eSE) of the mobile computing device and the TAC is generated based on the payment information and the offline payment request by using a TAC sub-key that is pre-generated and stored on the eSE.

16. The computer-implemented system of claim 13, further comprising one or more operations to send the offline transaction log to a server to deduct the payment amount from the available balance of the user account based on the offline transaction log.

17. The computer-implemented system of claim 13, wherein the offline payment request includes at least one of a payment account identifier, available balance of the payment account, a service entrance registration, or a service exit registration.

18. The computer-implemented system of claim 13, wherein the payment information includes the payment amount and at least one of a date and time of the offline payment request, a service entrance registration, a service exit registration, or station information associated with the offline payment request.

* * * * *